United States Patent
Hashii et al.

(10) Patent No.: US 8,040,569 B2
(45) Date of Patent: Oct. 18, 2011

(54) IMAGE PROCESSING APPARATUS AND METHOD FOR CONTRAST PROCESSING AND INTERMEDIATE COLOR REMOVAL

(75) Inventors: Yusuke Hashii, Kawasaki (JP); Fumihiro Goto, Kawasaki (JP); Masao Kato, Kawasaki (JP); Akitoshi Yamada, Yokohama (JP); Tetsuya Suwa, Yokohama (JP); Mitsuhiro Ono, Tokyo (JP); Fumitaka Goto, Tokyo (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 11/773,716

(22) Filed: Jul. 5, 2007

(65) Prior Publication Data

US 2008/0007785 A1   Jan. 10, 2008

(30) Foreign Application Priority Data

Jul. 7, 2006   (JP) .................................. 2006-188692

(51) Int. Cl.
   *G06T 5/00*   (2006.01)
(52) U.S. Cl. ........ 358/3.27; 358/1.9; 358/518; 382/162; 382/167; 382/274; 382/254; 382/173
(58) Field of Classification Search ................ 358/3.27, 358/1.9; 382/274, 254, 173, 199, 195, 190, 382/181, 266
   See application file for complete search history.

(56) References Cited

U.S. PATENT DOCUMENTS

| | | | | |
|---|---|---|---|---|
| 5,850,293 | A * | 12/1998 | Suzuki et al. | 358/3.27 |
| 2002/0071131 | A1 * | 6/2002 | Nishida | 358/1.9 |
| 2004/0001632 | A1 * | 1/2004 | Adachi | 382/224 |
| 2004/0076337 | A1 * | 4/2004 | Nishida | 382/274 |
| 2006/0023943 | A1 * | 2/2006 | Makino | 382/167 |

FOREIGN PATENT DOCUMENTS

| JP | 5-091322 A | 4/1993 |
|---|---|---|
| JP | 2000-316097 A | 11/2000 |
| JP | 2001-045303 A | 2/2001 |
| JP | 2001-223915 A | 8/2001 |

OTHER PUBLICATIONS

U.S. Appl. No. 11/771,458, filed Jun. 29, 2007.
U.S. Appl. No. 11/768,488, filed Jun. 26, 2007.

* cited by examiner

*Primary Examiner* — Benny Tieu
*Assistant Examiner* — Paul F Payer
(74) *Attorney, Agent, or Firm* — Fitzpatrick, Cella, Harper & Scinto

(57) ABSTRACT

This invention allows printing an image with less image deterioration with respect to a document including both text and an image. An image processing apparatus includes a pixel value acquisition unit which acquires a pixel value of a pixel as a target in an input digital image, and a pixel value correction/modification processing unit which executes a correction/modification process based on the pixel value of the pixel acquired by the pixel value acquisition unit. The pixel value correction/modification processing unit includes a contrast correcting unit which executes contrast correction based on information representing a brightness value corresponding to the pixel value of the pixel, and an intermediate color removing unit which removes intermediate color in the digital image by replacing the pixel value of the pixel by pixel values of pixels around that pixel.

11 Claims, 35 Drawing Sheets

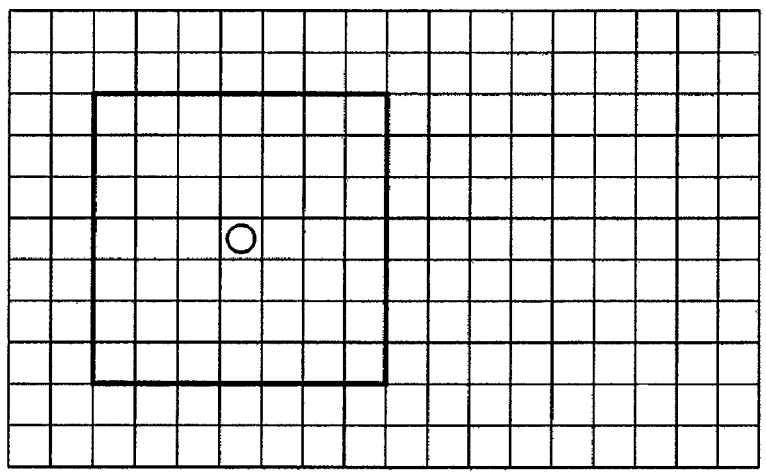
F I G. 4A
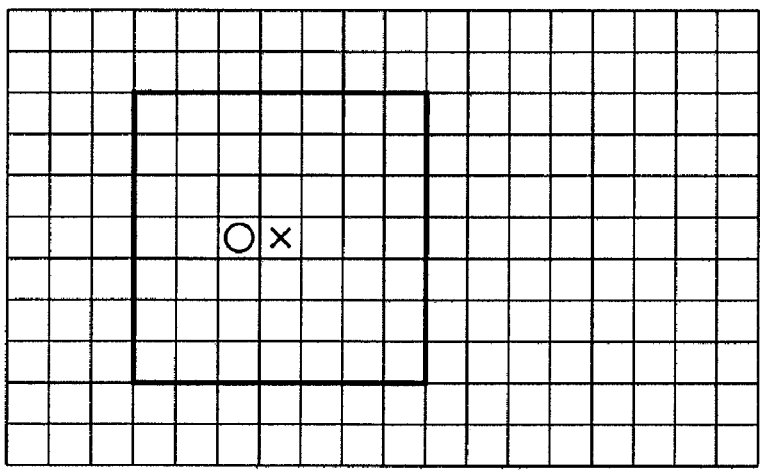
F I G. 4B
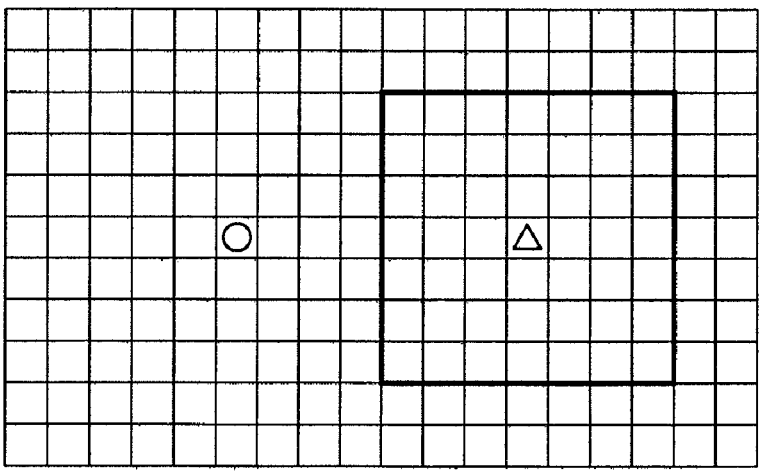
F I G. 4C

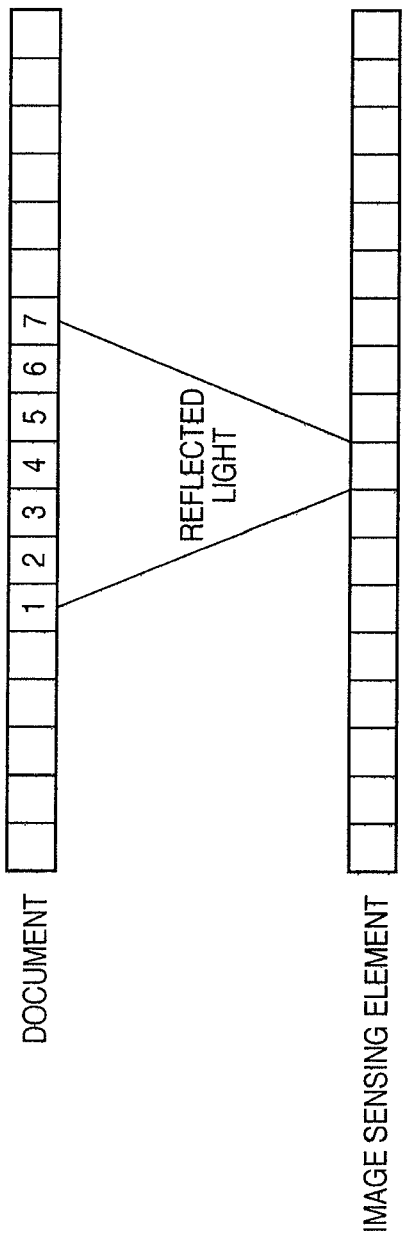
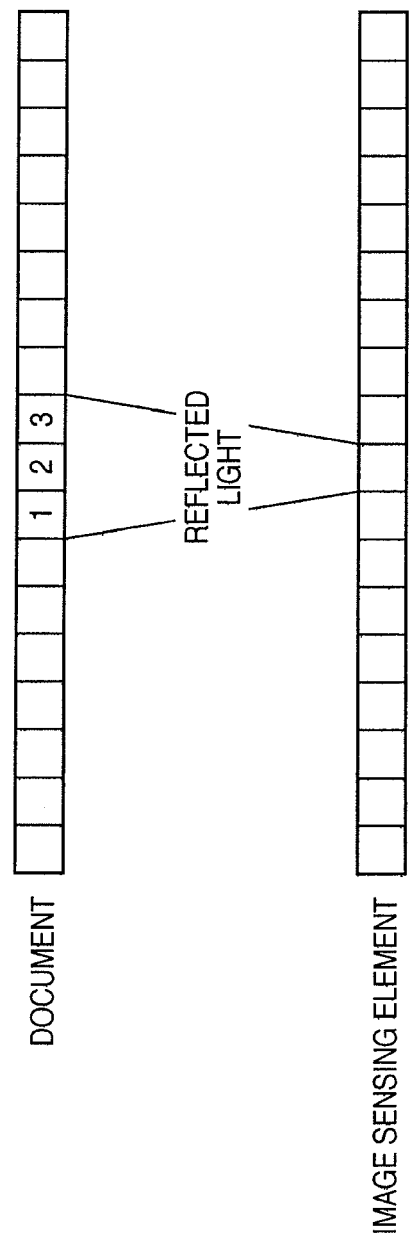

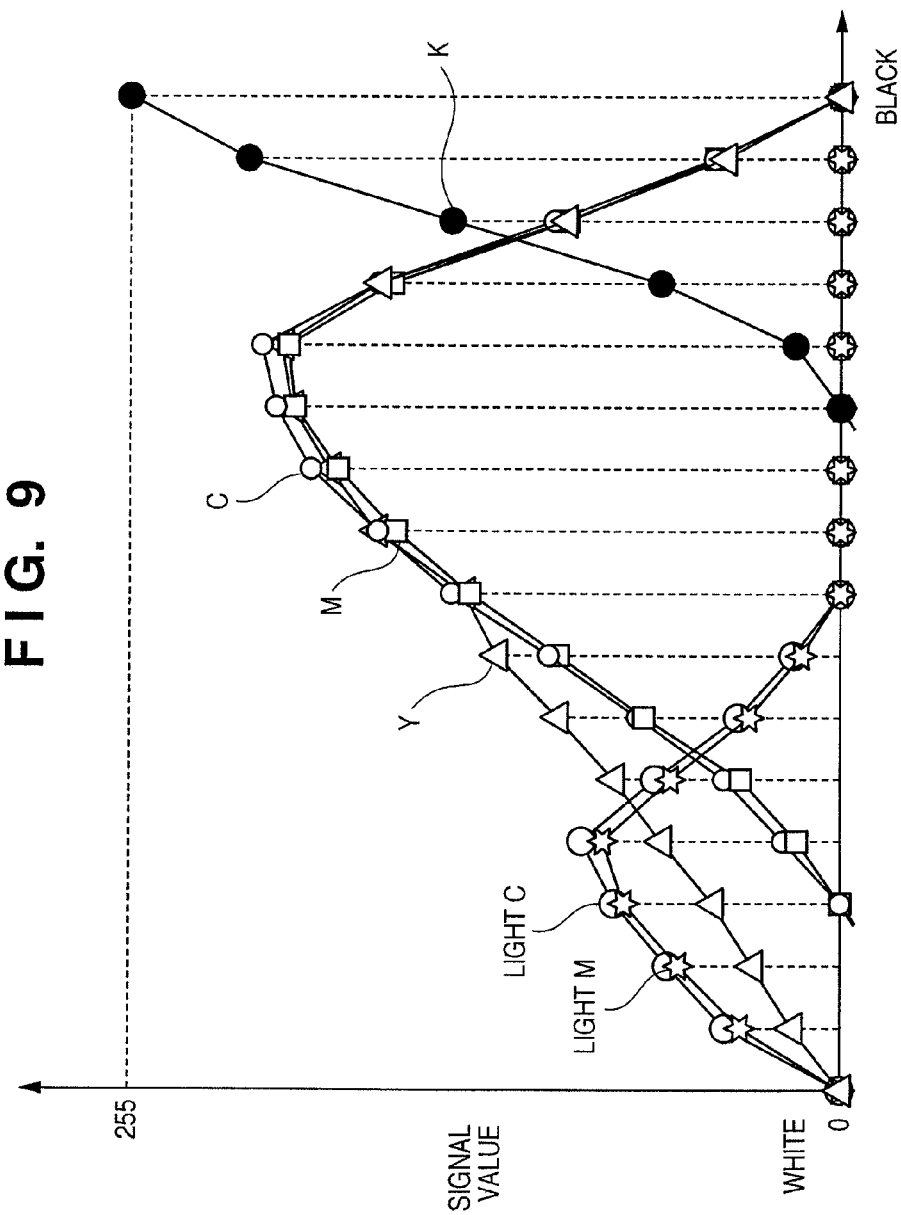

F I G. 13D
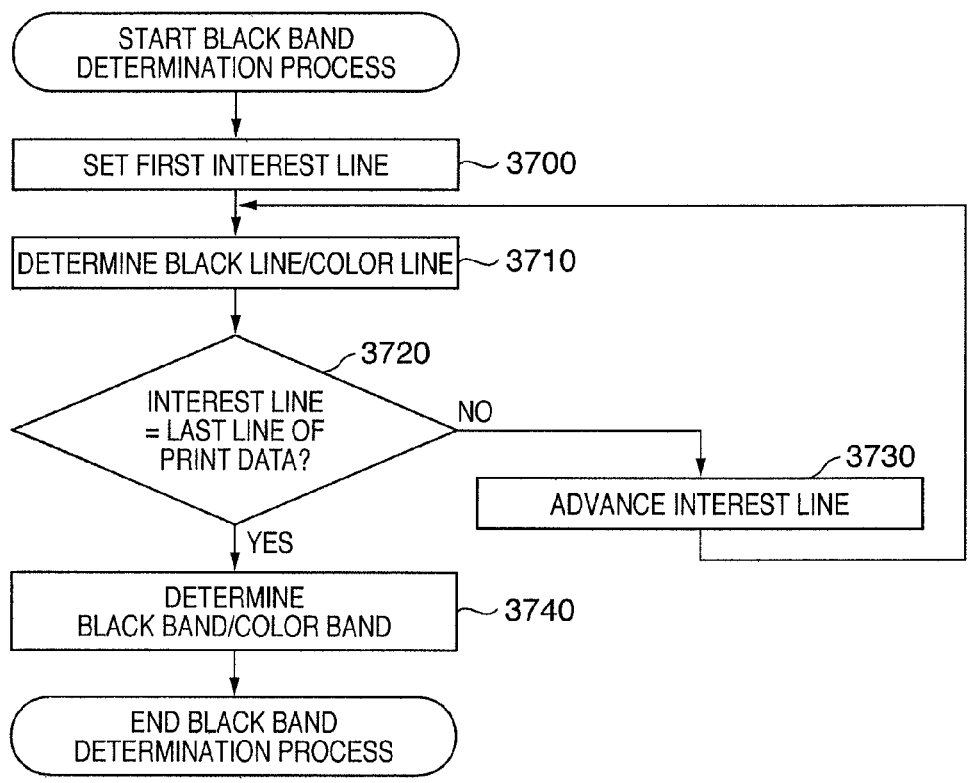

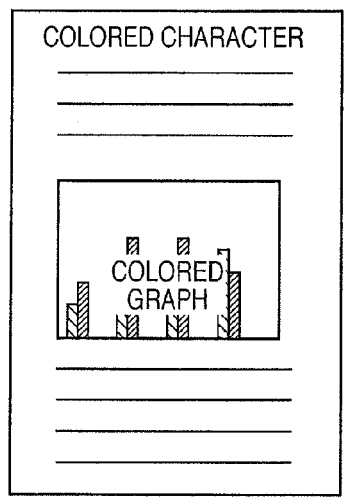
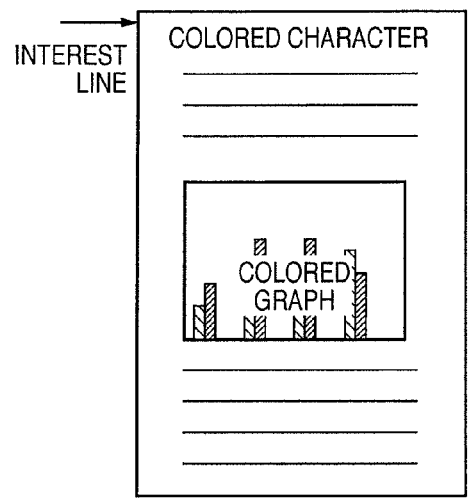
F I G. 20A    F I G. 20B
F I G. 20C    F I G. 20D

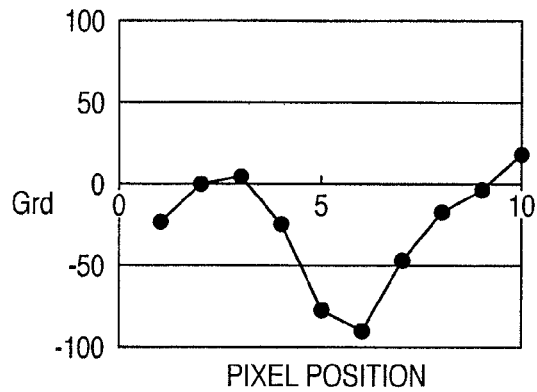
F I G. 22A
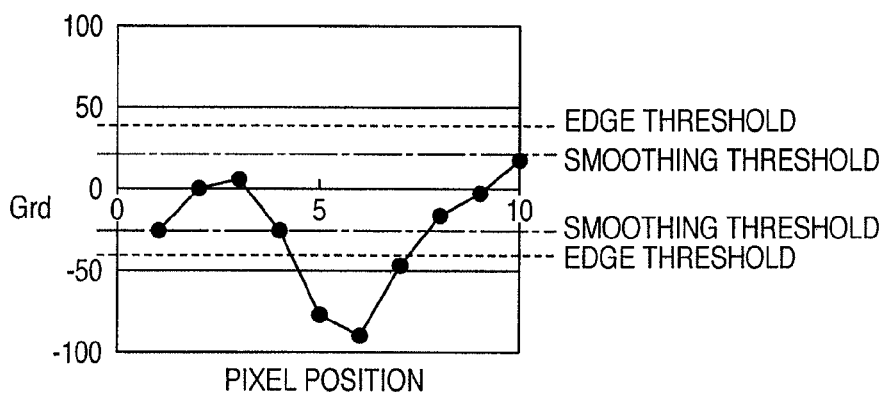
F I G. 22B
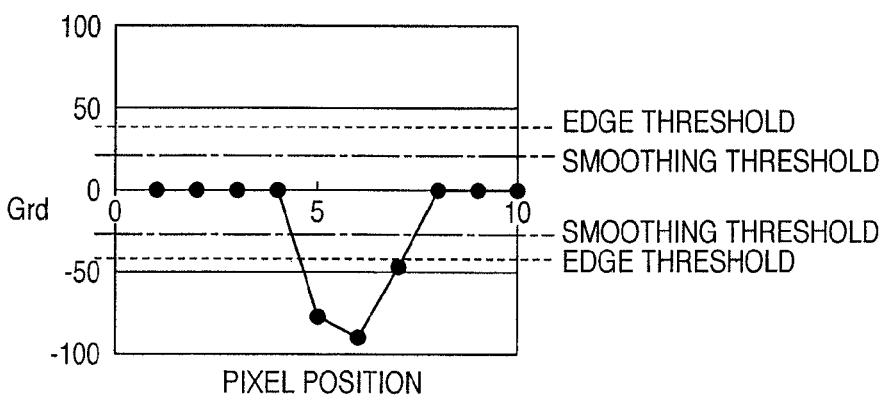
F I G. 22C

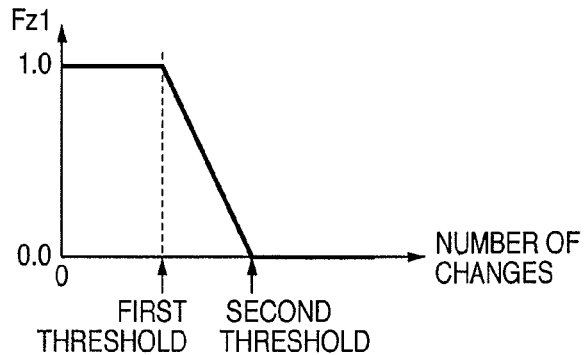
F I G. 23A
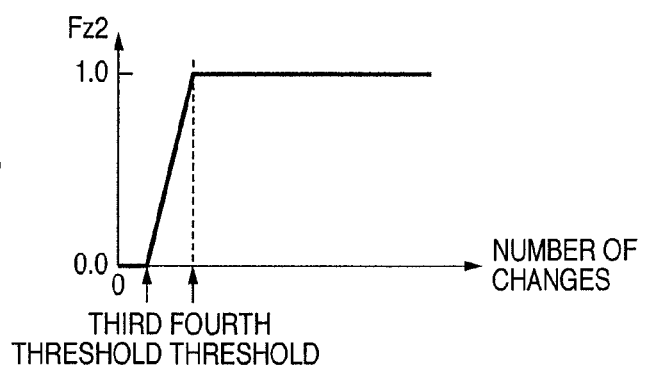
F I G. 23B
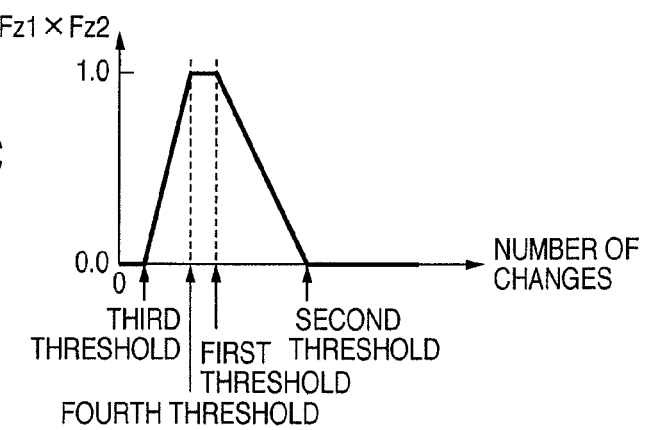
F I G. 23C
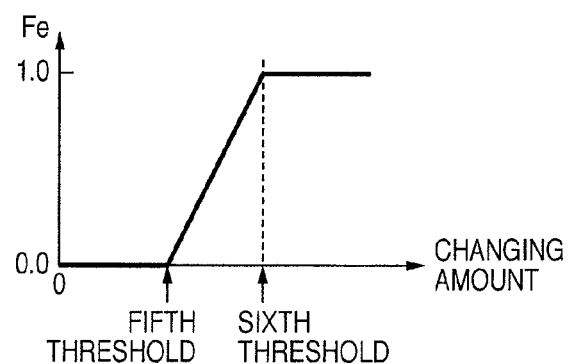
F I G. 23D

| -6 | -15 | -14 | -15 | -6 |
|---|---|---|---|---|
| -15 | 8 | 42 | 8 | -15 |
| -14 | 42 | 128 | 42 | -14 |
| -15 | 8 | 42 | 8 | -15 |
| -6 | -15 | -14 | -15 | -6 |

FIG. 24A

| -6 | -15 | -14 | -15 | -6 |
|---|---|---|---|---|
| -15 | 8 | 42 | 8 | -15 |
| -14 | 42 | 0 | 42 | -14 |
| -15 | 8 | 42 | 8 | -15 |
| -6 | -15 | -14 | -15 | -6 |

FIG. 24B

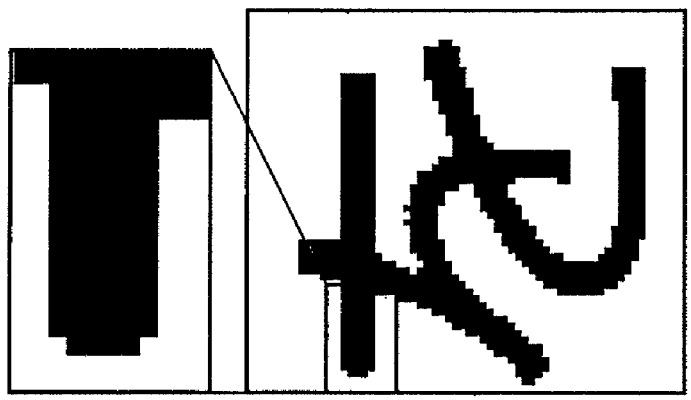
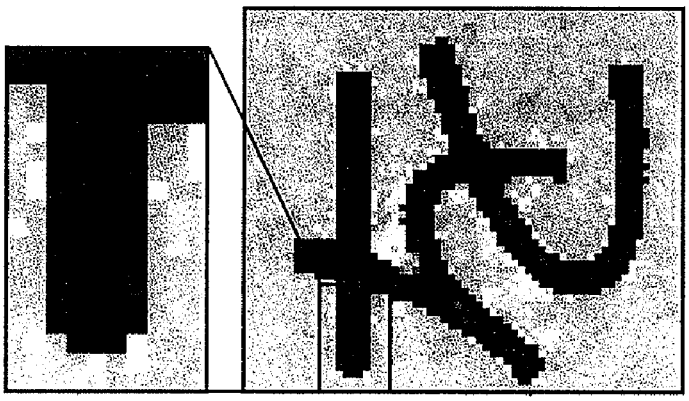
FIG. 25C
FIG. 25B
FIG. 25A

F I G. 27
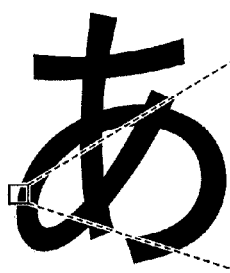
| 240 | 200 | 150 | 60 | 30 | 20 | 10 |
| --- | --- | --- | --- | --- | --- | --- |
| 242 | 190 | 143 | 40 | 20 | 25 | 6 |
| 243 | 182 | 150 | 80 | 20 | 10 | 8 |
| 244 | 190 | 150 | 70 | 25 | 10 | 9 |
| 242 | 205 | 147 | 60 | 16 | 15 | 7 |
| 243 | 210 | 140 | 90 | 20 | 18 | 9 |
| 244 | 200 | 150 | 80 | 18 | 9 | 8 |

IMAGE PROCESSING APPARATUS AND METHOD FOR CONTRAST PROCESSING AND INTERMEDIATE COLOR REMOVAL

BACKGROUND OF THE INVENTION

1. Field of the Invention

The present invention relates to an image processing apparatus and image processing method, which form an output image based on an input image, and an image processing apparatus and program, which record an output image on a print recording medium such as a paper sheet or the like.

2. Description of the Related Art

In general, a digital copying machine scans a document image for respective pixels using an image sensor or the like, and A/D (analog-to-digital) converts an analog electrical signal obtained as the output of the image sensor. The digital copying machine applies various processes to the obtained digital signal, and supplies the processed signal to a recording device to record (to be also referred to as "print" hereinafter) an output image.

Especially, a digital color copying machine scans a document image printed or drawn on a paper sheet while color-separating it into R (red), G (green), and B (blue). Then, the digital color copying machine sets the obtained RGB digital data as document data, and decides the output amounts of color materials represented by C (cyan), M (magenta), and Y (yellow) and a monochrome material represented by K (black) based on the document data. After that, the digital color copying machine sets, e.g., the obtained CMYK digital data as output data, and outputs an output image to a print recording medium (to be referred to as a recording medium hereinafter) based on the output data.

When a document which includes both a photograph and text (for example, an article of a magazine or the like) is used as a document image, it is normally the case to form, in the document image, a photograph part mainly by a color image, and to form a text part mainly by a monochrome image. A case will be examined below wherein, for example, an output image is to be output onto a recording medium such as a paper sheet or the like upon scanning a monochrome document image to form an output image. In this case, as for a text part formed by monochrome image information in the document image, it is often desirable to output a corresponding part in the output image using only a monochrome material. The reasons for this will be described below.

First, the text part mainly includes monochrome images of characters. Therefore, upon recording these character monochrome images, only the monochrome material is used without mixing any color materials to obtain output images with sharp edges.

Second, since the output process is done using only the monochrome material for a monochrome image part, the data size to be handled can be reduced compared to that including the color materials. Therefore, computation processes can be simplified.

Third, assume that a printing device like an ink-jet printing device to be described later is used, which provides a mechanism that adopts, as an output system, a serial system that sequentially outputs a document image for respective lines, thereby performing an output process for respective lines. In this case, assume that a mechanism is adopted, which outputs a larger number of lines at once upon using only the monochrome material than a case including the color materials. Upon recording a document image on which a monochrome image part continues over a plurality of lines, a larger number of lines can be output per unit time compared to the remaining image part, thus speeding up recording.

However, upon scanning a document image including both a photograph and text to form an output image, a monochrome image part in the document image often requires the color materials. The reasons for this will be described below.

As the first reason, it is desirable to generate output data that does not require any color material upon outputting a blank part of a document when a document image of a monochrome image part is scanned using an image sensor or the like. However, the color of original medium itself such as a paper sheet or the like used as an original document (so-called a background color) is not white in practice. Therefore, output data that reflects the background color is generated, and as a result, even output data of the blank part of the document requires the color materials.

As the second reason, it is desirable to generate output data which uses only the monochrome material upon outputting parts corresponding to the black portions of a document when a monochrome document image is scanned using the image sensor or the like. However, the parts corresponding to the black portions of the document are not purely black and have a tint of some other color. For this reason, output data that reflects a color scanned by the image sensor is generated, and as a result, the output data of the part corresponding to black of the document requires the color materials.

As the third reason, the image sensor scans a part corresponding to a boundary between a blank part and black part of a document as an intermediate color between white and black depending on the quality of the document image and the scanning precision of the image sensor, when a document image of a monochrome image part is scanned using the image sensor or the like. Therefore, output data that reflects such intermediate color is generated, and as a result, the output data of the part corresponding to the boundary between the blank part and black part of the document requires the color materials.

In order to solve the problem posed due to the first reason, an under-color removal process can be applied, which modifies the scanned document image by converting pixels with high luminance values into white pixels, as described in, e.g., Japanese Patent No. 02605316.

In order to solve the problem posed due to the second reason, a black removal process can be applied, which modifies the scanned document image by converting pixels with low luminance values into black pixels in the same manner as the under-color removal process.

A combined effect of the under-color removal process and black removal process can be obtained by a tone correction process of an image, as disclosed in, e.g., Japanese Patent Laid-Open No. 05-091322.

Furthermore, in order to solve the problem posed due to the third reason, a modification process that removes an intermediate color has been proposed. As a conventional method of the modification process for removing an intermediate color, a technique that binarizes an image using an arbitrary threshold, and the like, has been proposed.

For example, as a prior art that combines these techniques and obtains a preferable binarization result by applying binarization after the tone correction, Japanese Patent Laid-Open No. 2001-045303 is available. As described in Japanese Patent Laid-Open No. 2001-045303, minimum and maximum densities of each channel are derived for density histograms of respective RGB components of a document image, and each density histogram distribution is expanded to have the derived minimum and maximum densities as values at the two ends of a data value range, thus implementing the binarization process.

However, upon applying the technique disclosed in Japanese Patent Laid-Open No. 2001-045303 to a color image, not only a black character area but also a color image area are binarized. Hence, even a document including both black characters and a color photograph is binarized to a monochrome image.

To take measures, to perform area segmentation described in the related arts (Japanese Patent Laid-Open No. 2000-316097, Japanese Patent Laid-Open No. 2001-223915, and the like) and to apply the binarization process to only a part judged as black characters can be thought of. However, since the binarization is turned on/off at a boundary between the part judged as black characters and the remaining part, image quality considerably changes upon switching areas, and high image quality cannot be obtained.

That is, the related arts can modify a monochrome image part to an image that does not require any color materials. A case will be examined below wherein a mechanism that adopts a serial recording system like an ink-jet printing device to be described later and outputs an image for respective lines by using a monochrome material alone upon recording an image that has undergone such modification. In this case, since the mechanism that can output a larger number of lines at once compared to a case including color materials is adopted, the recording speed of an image including black characters together can be increased. However, in such a case, image quality deteriorates considerably.

In order to obtain high image quality, a black character area is binarized to black and white, while image processes which continuously change according to feature amounts of image areas so as not to impair original tones are applied to a smooth tone area.

SUMMARY OF THE INVENTION

It is, therefore, an object of the present invention to allow printing of an image with less image deterioration by combining contrast correcting means and intermediate color removing means.

According to one aspect of the present invention, an image processing apparatus for processing a digital image including a multi-level image signal of at least one color, comprises:

a pixel value acquisition unit adapted to acquire a pixel value of a pixel as a target in an input digital image; and a pixel value correction/modification processing unit adapted to execute a correction/modification process based on the pixel value of the pixel acquired by the pixel value acquisition unit, wherein the pixel value correction/modification processing unit comprises:

a contrast correcting unit adapted to execute contrast correction based on information representing a brightness value corresponding to the pixel value of the pixel;

an area setting unit adapted to set at least one area including a plurality of pixels including an interest pixel; and a replacement unit adapted to replace the interest pixel by a pixel within the area set by the area setting unit with regard to the interest pixel.

According to another aspect of the present invention, a method of controlling an image processing apparatus for processing a digital image including a multi-level image signal of at least one color, comprising:

a pixel value acquisition step adapted to acquire a pixel value of a pixel as a target in an input digital image; and a pixel value correction/modification processing step adapted to execute a correction/modification process based on the pixel value of the pixel acquired in the pixel value acquisition step, wherein the pixel value correction/modification processing step comprises:

a contrast correcting step adapted to execute contrast correction based on information representing a brightness value corresponding to the pixel value of the pixel;

an area setting step adapted to set at least one area including a plurality of pixels including an interest pixel; and a replacement step adapted to replace the interest pixel by a pixel within the area set in the area setting step with regard to the interest pixel.

In order to achieve the above object, according to still another embodiment of the present invention, a computer-executable program which describes the sequence of the method of controlling an image processing apparatus is provided.

According to the present invention, by combining the contrast correcting means and intermediate color removing means, images containing black characters are reconfigured into two distinct areas, white area as the background color and black area as the character color, and an image with less image deterioration can be consequently printed.

Further features of the present invention will become apparent from the following description of exemplary embodiments with reference to the attached drawings.

BRIEF DESCRIPTION OF THE DRAWINGS

FIGS. 4A to 4C are explanatory views of a process unit according to the embodiments of the present invention;

FIGS. 6A and 6B are explanatory views of a scan range of an image sensing element according to the embodiments of the present invention;

FIG. 9 is a graph of output device color conversion characteristics in a grayscale according to the embodiments of the present invention;

FIGS. 13A to 13D are flowcharts for explaining the operations according to the fourth embodiment of the present invention;

FIGS. 20A to 20D are explanatory views of a black band determination process according to the fourth embodiment of the present invention;

FIGS. 22A to 22C are graphs for explaining the changing times correction according to the embodiment of the present invention;

FIGS. 23A to 23D are graphs for explaining the edge strength setting according to the embodiment of the present invention;

FIGS. 24A and 24B are explanatory views of edge enhancing filter coefficients according to the embodiment of the present invention;

FIGS. 25A to 25C are explanatory views of the correction effect according to the embodiment of the present invention;

FIG. 27 is an explanatory view of the brightness distribution upon applying the contrast correction according to the embodiment of the present invention to a document image.

DESCRIPTION OF THE EMBODIMENTS

Embodiments of the present invention will be described hereinafter.

<MFP>

Figure 1A:
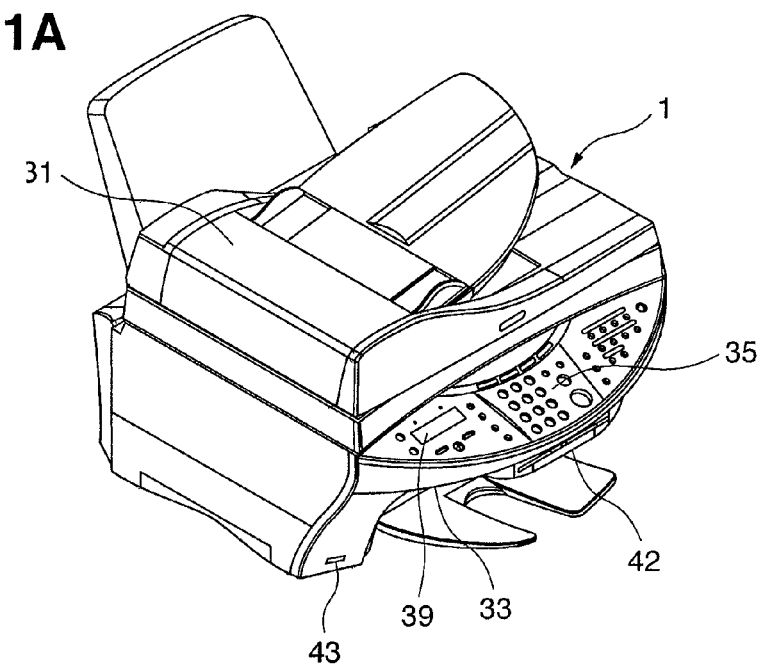
FIGS. 1A and 1B are perspective views for explaining an MFP to which embodiments of the present invention are applicable.
Figure 1B:
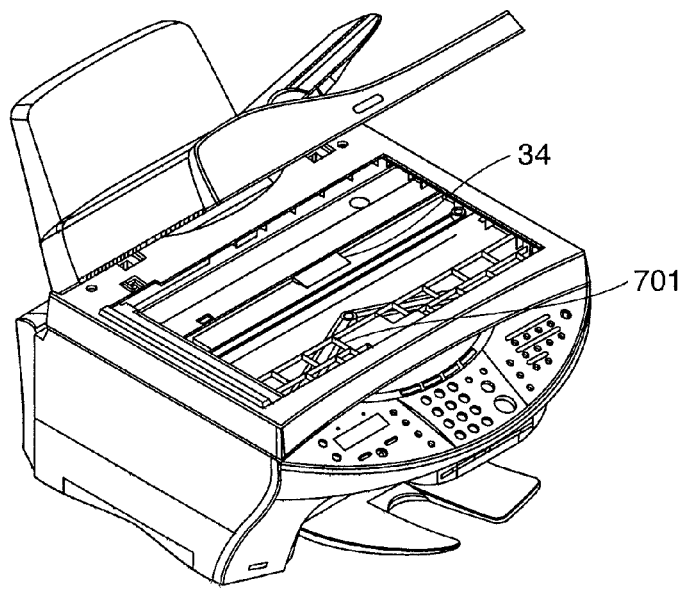

FIGS. 1A and 1B are schematic perspective views of a multi-function peripheral apparatus (to be also referred to as MFP hereinafter) 1 which can be used in the embodiments of the present invention. This MFP 1 has a function of printing data received from a host computer (to be also referred to as PC hereinafter) as a normal PC printer, and a function as a scanner. Furthermore, functions of the MFP 1 alone include a copy function of printing an image scanned by the scanner, a function of printing image data directly read from a storage medium such as a memory card or the like, or a function of printing image data received from a digital camera or the like.

Referring to FIGS. 1A and 1B, the MFP 1 comprises a scanning device 34 such as a flatbed scanner or the like, a printing device 33 of an ink-jet system, electrophotography system, or the like, and an operation panel 35 which comprises a display panel 39, various key switches, and the like. The MFP 1 comprises a USB port (not shown) used to communicate with the PC on its back surface, so as to make communications with the PC. Furthermore, the MFP 1 comprises a card slot 42 used to read out data from various memory cards, a camera port 43 used to make data communications with a digital camera, an auto document feeder (to be also referred to as ADF hereinafter) 31 used to automatically set a document on a document table, and the like.

Figure 2:
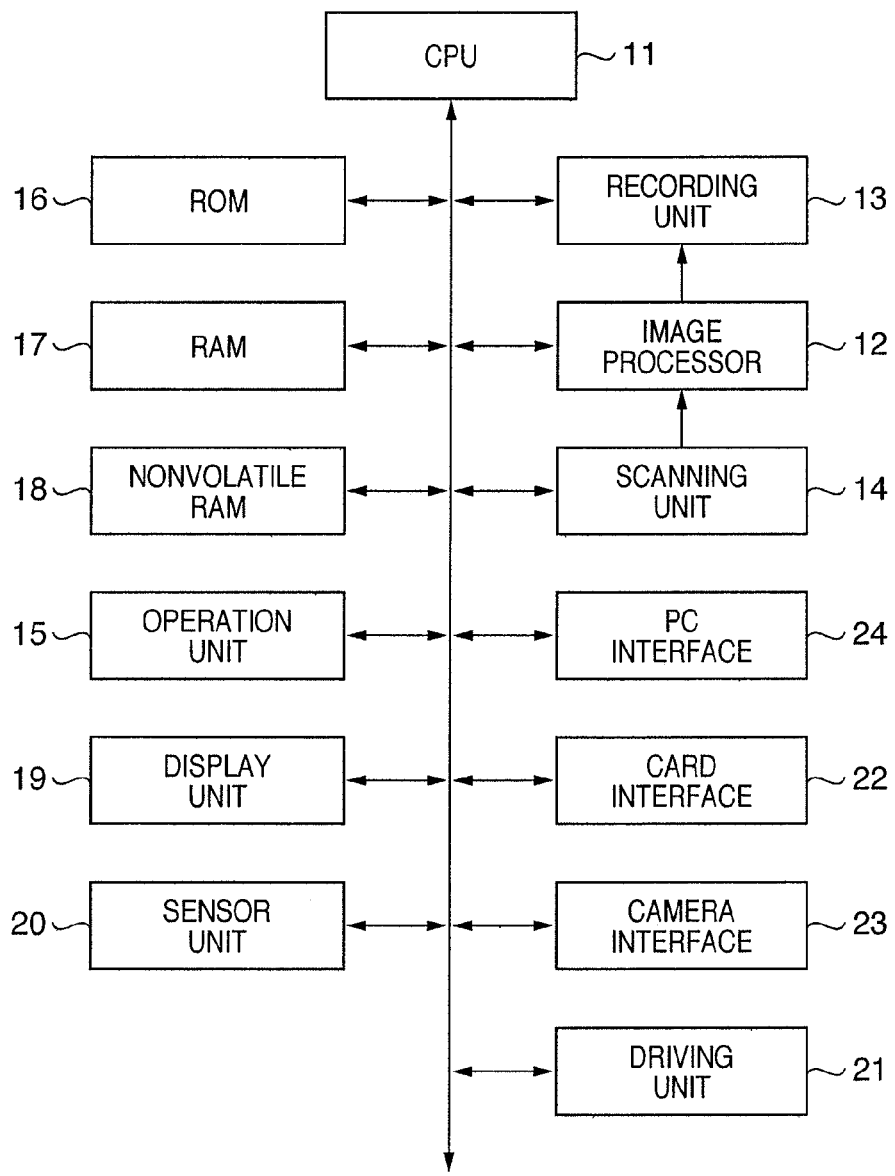
FIG. 2 is a block diagram for explaining control of the MFP to which the embodiments of the present invention are applicable.

FIG. 2 is a functional block diagram of the MFP 1 shown in FIGS. 1A and 1B. Referring to FIG. 2, a CPU 11 controls various functions of the MFP 1, and executes programs of various processes stored in a ROM 16 in accordance with operations at an operation unit 15 corresponding to the operation panel 35 in FIG. 1A. A scanning unit 14, which comprises a CCD, corresponds to the scanning device 34 in FIG. 1B, scans a document image, and outputs analog luminance data of red (R), green (G), and blue (B). The scanning unit 14 may comprise a contact image sensor (CIS) in place of the CCD. When the MFP 1 comprises the ADF 31 shown in FIG. 1A, the scanning unit 14 can successively scan documents.

A card interface 22 also corresponds to the card slot 42 in FIG. 1A, and reads image data, which is captured by, e.g., a digital still camera (to be also referred to as DSC hereinafter) and is stored in a memory card or the like, in accordance with a predetermined operation at the operation unit 15. Note that the color space of image data read via the card interface 22 is converted by an image processor 12 from that (e.g., YCbCr) of the DSC into a standard RGB color space (e.g., NTSC-RGB or sRGB) if necessary. The read image data undergoes various processes, if necessary, such as resolution conversion into the effective number of pixels and the like required for applications based on its header information. Also, a camera interface 23 corresponds to the camera port 43 in FIG. 1A, and reads image data by directly connecting a DSC.

The image processor 12 executes image processes such as image analysis, calculations of conversion characteristics, conversion from luminance signals (RGB) into density signals (CMYK), scaling, gamma conversion, quantization, error diffusion, and the like, which will be described later using FIG. 3. The data that has undergone these processes is stored in a RAM 17. When corrected data stored in the RAM 17 reaches a predetermined data size required to be recorded by a recording unit 13, the recording unit 13 executes a recording operation.

A nonvolatile RAM 18 comprises, e.g., a battery backed-up SRAM or the like, and stores data unique to the image processes and the like. The operation unit 15 corresponds to the operation panel 35. The operation unit 15 has a photo direct recording start key which allows the user to select image data stored in a storage medium (memory card) and to start recording, a key used to record a document, a key used to scan a document, a copy start key in a monochrome copy mode or color copy mode, and the like. Furthermore, the operation unit 15 has a mode key used to designate a mode such as a copy resolution, image quality, and the like, a stop key used to stop a copy operation, a numerical keypad used to input a copy count, a registration key, and the like. The CPU 11 detects the pressing states of these keys and controls respective units according to the detected states.

A display unit 19 corresponds to the display panel 39 in FIG. 1A, comprises a dot matrix type liquid crystal display unit (to be also referred to as an LCD hereinafter) and an LCD driver, and makes various displays under the control of the CPU 11. Also, the display unit 19 displays thumbnails of image data recorded in a storage medium. The recording unit 13 corresponds to the printing device 33 in FIG. 1A, and comprises an ink-jet unit 701 of an ink-jet system, general-purpose IC, and the like. The recording unit 13 reads out recording data stored in the RAM 17 and outputs it as a hard copy under the control of the CPU 11.

Figure 7:
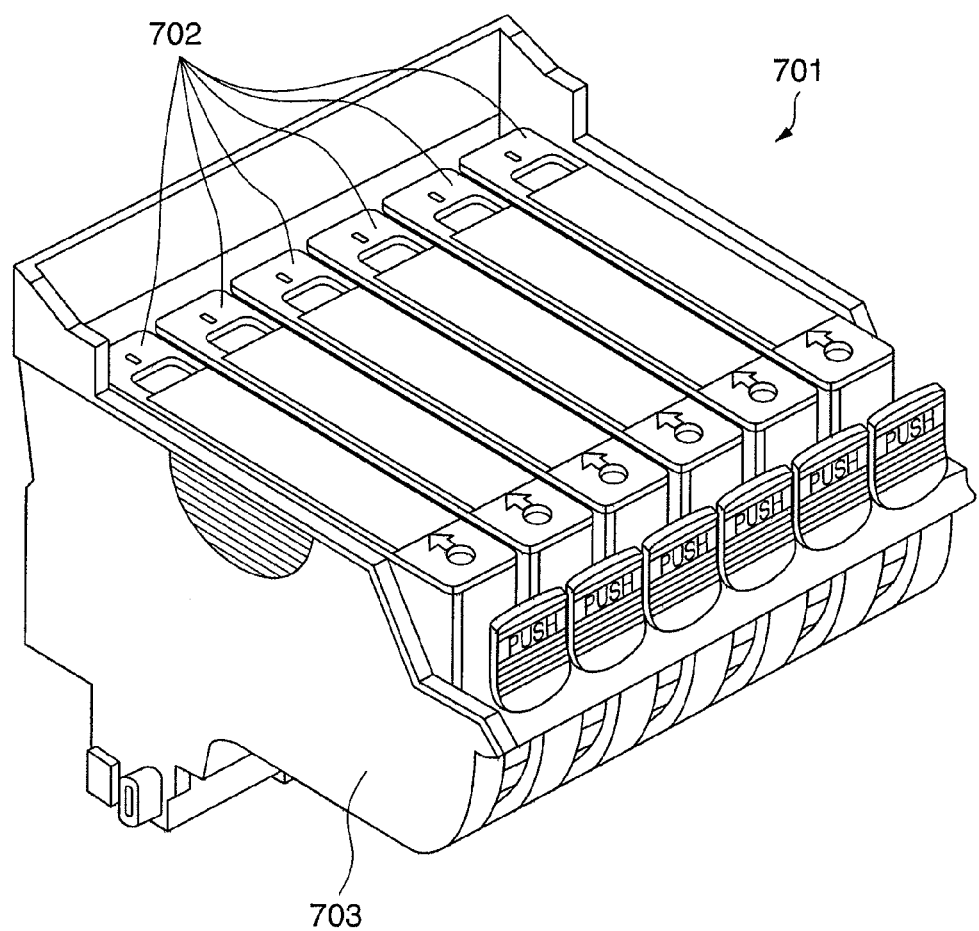
FIG. 7 is an explanatory view of an ink-jet unit according to the embodiments of the present invention.
Figure 8:
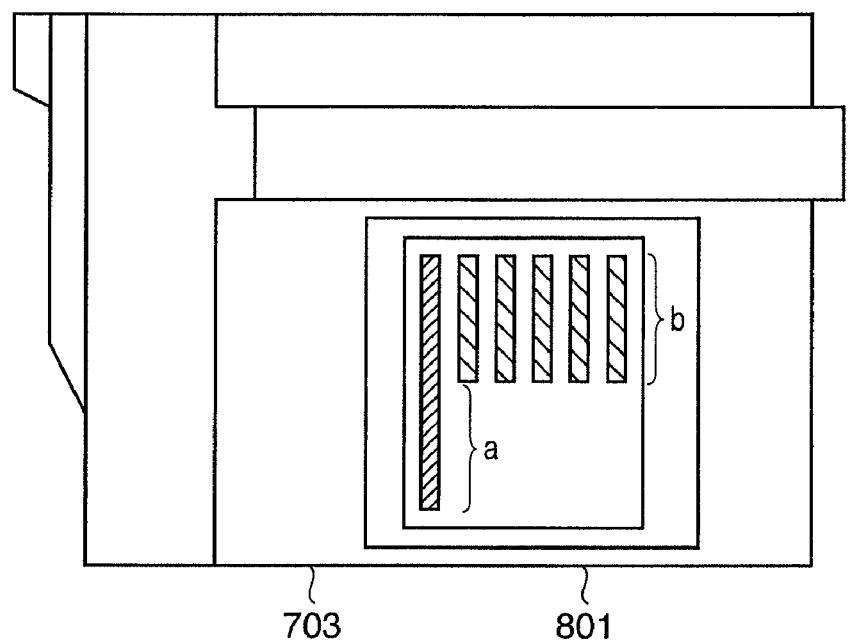
FIG. 8 is a bottom view of a carriage according to the embodiments of the present invention.

FIG. 7 shows the ink-jet unit 701. The ink-jet unit 701 comprises ink cartridges 702 and a carriage 703. FIG. 8 shows the bottom surface of the carriage 703. A recording head 801 is attached to the carriage 703.

The ink cartridges 702 include color ink cartridges of respective colors including cyan (C), magenta (M), yellow (Y), light cyan (PC), and light magenta (PM). The ink cartridges 702 include six different types of ink cartridges including a black (Bk) ink cartridge, which are independently inserted in the carriage 703 and communicate with the recording head 801.

Ink stored in each color ink cartridge 702 has a high infiltration rate into a recording sheet so as to prevent ink bleed at color boundaries upon forming a color image. On the other hand, black (Bk) ink stored in the black ink cartridge has a lower infiltration rate into a recording sheet relative to that of the color ink so as to form a high-quality black image with high density and little ink bleed.

On the front surface portion of the recording head 801, ejection port groups of cyan, magenta, yellow, light cyan, light magenta, and black (Bk) are formed parallel to each other. Each of the groups for cyan, magenta, yellow, light cyan, and light magenta has 512 ejection ports, and the group for black has 1024 ejection ports. Neighboring groups have a spacing equal to or larger than a nozzle pitch.

Each of these ejection ports has an ink channel communicating with the ejection port, and a common ink chamber is provided behind a portion where ink channels are arranged. For the ink channel corresponding to each ejection port, a thermoelectric transducer for generating heat energy used to eject an ink droplet from the corresponding ejection port, and an electrode wiring used to supply electric power to that transducer are arranged. These thermoelectric transducers (ejection heaters) and electrode wirings are formed on, e.g., a silicon substrate (not shown) by a film formation technique. Furthermore, a resin, glass partition, top plate, and the like are laminated on this substrate to form the ejection ports, ink channels, and common ink chambers. Behind the substrate, a drive circuit for driving the thermoelectric transducers based on recording signals is provided in the form of a printed circuit board.

Alternatively, An orifice plate formed with a partition used to separate a plurality of ink channels, common ink chambers, and the like may be adhered to the substrate without using any glass. The orifice plate is integrally molded, and polysulfone is preferably used as an integral molding material, but other molding resin materials may be used.

This embodiment, exchangeable, independent ink tanks are used. Alternatively, a disposable recording head that integrates an ink tank and printhead may be used.

Referring back to FIG. 2, a driving unit 21 includes stepping motors for driving feed and discharge rollers, gears for transmitting the driving forces of the stepping motors, a driver circuit for controlling the stepping motors, and the like in the operations of the scanning unit 14 and recording unit 13.

A sensor unit 20 includes a recording sheet width sensor, recording sheet presence sensor, document width sensor, document presence sensor, recording medium detection sensor, and the like. The CPU 11 detects the states of a document and recording sheet based on information obtained from these sensors.

A PC interface 24 is an interface between the PC and MFP 1. The MFP executes a print recording operation, scan operation, and the like in accordance with requests from the PC via the PC interface 24.

In a copy operation, the MFP 1 processes image data, which is scanned by the scanning device 34, and prints the processed data by the printing device 33. Upon instruction of a copy operation via the operation unit 15, the scanning unit 14 scans an image of a document placed on the document table. The scanned data is sent to the image processor 12, which applies image processes to be described later to the scanned data. The processed data is sent to the recording unit 13 and is printed.

<Image Processes>

Figure 3:
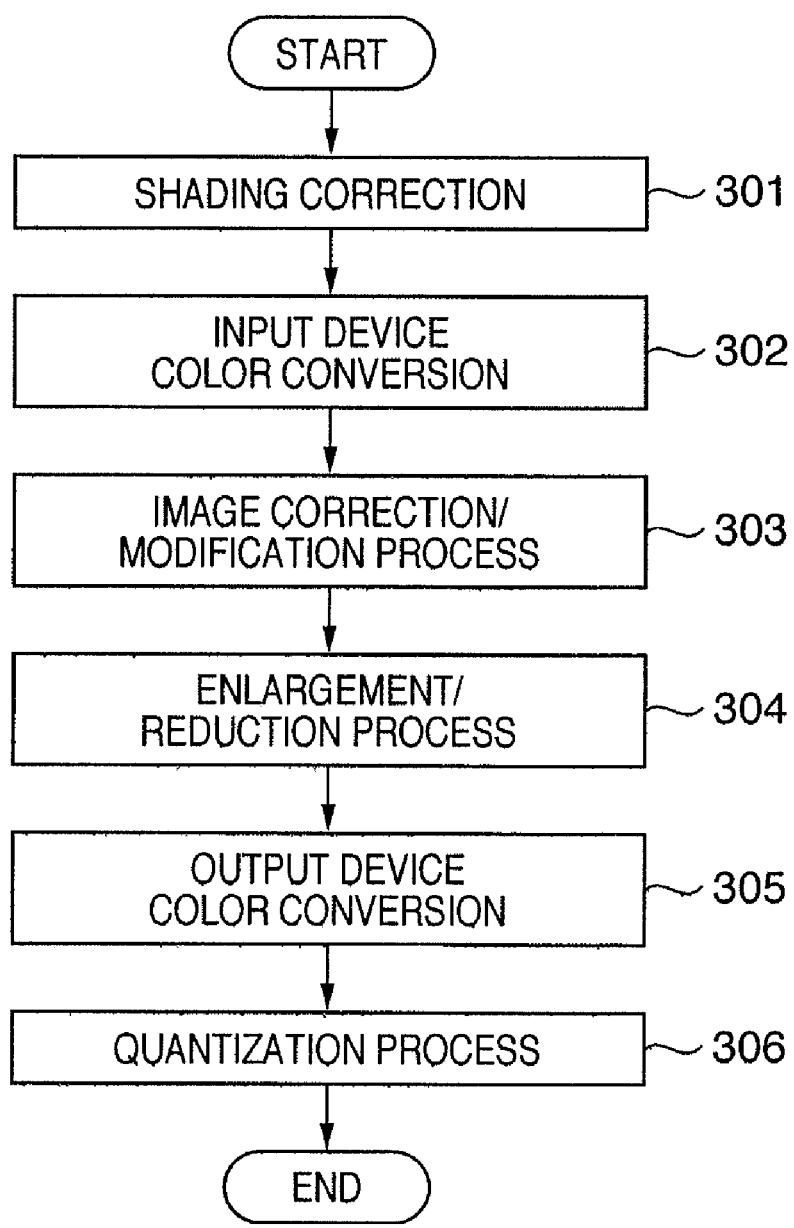
FIG. 3 is a flowchart of image processes of the MFP to which the embodiments of the present invention are applicable.

FIG. 3 is a flowchart of the operations of image processes executed by the MFP 1 in the copy mode. The image processor 12 in FIG. 2 executes these image processes.

The respective steps will be described below, but the details of a processing method irrelevant to the essential part of the present invention will not be explained.

In step 301, the image processor 12 applies shading correction, for correcting variations of the CCD as the image sensing element, to image data, which is scanned by the scanning unit 14 of the MFP 1 and is A/D (analog-to-digital)-converted. In step 302, the image processor 12 then executes input device color conversion of that image data. This process converts device-dependent image data into data of a standard color space such as sRGB standardized by IEC (International Electrotechnical Commission), AdobeRGB propounded by Adobe Systems, or the like. The conversion method in this case includes an arithmetic method using a 3×3 or 3×9 matrix, a lookup table method which decides values based on a table that describes conversion rules, and the like.

In step 303, the image processor 12 executes an image correction/modification process of the converted image data. The processing contents in this step include an edge enhancing process that corrects blurring as a result of scanning, a text modification process that improves legibility of text, a process for removing bleed-through that has occurred due to scanning upon light irradiation, and the like. It is desirable to execute the processes as characteristic features of the present invention in this step, as will be described later.

In step 304, the image processor 12 executes an enlargement/reduction process. This process converts image data to a desired scale when the user designates a zoom scale, a layout copy mode that lays out two document images on one sheet, or the like. As the conversion method, methods such as a bicubic method, nearest neighbor method, and the like are generally used. In step 305, the image processor 12 executes an output device color conversion process for converting image data on the standard color space into output device-dependent data. In this embodiment, the MFP 1 comprises the printing device 33 of the ink-jet system, and the image processor 12 executes a conversion process into image data of ink colors such as cyan, magenta, yellow, black, and the like. This conversion process can use the same method as in step 302.

FIG. 9 shows the way the conversion process from RGB values into ink color data in this step is executed, taking as an example the grayscale from white (R=G=B=255) to black (R=G=B=0). The abscissa of the graph plots the R, G, and B values (which assume identical values as the grayscale is used) on the aforementioned standard color space, and the ordinate of the graph plots signal values of the ink color data of respective inks. Curves C, M, Y, light C, light M, and K respectively represent the signal values of cyan, magenta, yellow, light cyan, light magenta, and black inks. As can be seen from the graph of FIG. 9, for white, the signal values of all the inks become zero. For black, only the signal value of the black ink is maximum, and those of other inks become zero.

Referring back to FIG. 3, in step 306 the image processor 12 executes a quantization process as conversion into the number of recordable levels based on the signal values calculated in step 305. For example, in case of binary expression, i.e., ON/OFF of ink dots, the image processor 12 may binarize image data by a quantization method such as error diffusion or the like. For an ink whose signal value="0" in step 305 in a certain pixel, no ink dot is printed upon forming that pixel. Therefore, upon forming a white pixel, none of ink dots of inks are printed. On the other hand, upon forming a black pixel, ink dots of only the black ink are printed. That is, when a certain image area is formed by only white and black pixels, only black dots are used to print that area. As a result, the image processor 12 can convert the image data into a data format that the printer can record, and recording is done by a recording process to be described below.

<Recording Process>

As has been explained in the description of the ink cartridges 702, the black ink and color inks have different ink properties. In the recording operation, the way the recording head 801 is used is selected upon forming only a black image or upon forming a color image. That is, upon forming only a black image in FIG. 8, the whole black ejection port array is used. However, upon forming a color image, partial array "a" in FIG. 8 is used for black in the color image, and arrays "b" in FIG. 8 are used for colors.

With this configuration, when partial black ejection port array "a" is used and the printhead is scanned in the lateral direction in FIG. 8 (main scan direction), black image data is formed on a print medium. After that, the print medium is conveyed (sub-scanned) by distance "a" in the longitudinal direction of FIG. 8 (to be referred to as sheet feed hereinafter), and an image is formed by color ejection port arrays "b" in the next main scan process of the printhead. In this way, an image for one print area is completed. When color ejection port arrays "b" form an image, partial black ejection port array "a" forms a black image on the next print area.

According to this image formation method, the color inks are printed on a print medium in a print scan next to that in which the black ink is printed on the print medium. For this reason, compared to a case in which both the black and color inks are printed on a single print area in a single print scan, a time required to infiltrate and fix the black ink on the print medium can be assured before printing of the color inks. Therefore, it is advantageous to reduce bleeding of the black color.

<Image Process Unit>

FIGS. 4A to 4C are views for explaining a process unit used upon execution of processes as characteristic features of the present invention (to be referred to as image correction processes).

A case will be explained first wherein the process unit is a pixel unit. Assuming that a pixel indicated by "○" in FIG. 4A is an interest pixel, an area (7×7 area) defined by 7×7 pixels including the interest pixel is set, as indicated by the bold line in FIG. 4A. A correction strength for the interest pixel is set using image data in the 7×7 area set in this way, thus correcting the interest pixel. After correction of the interest pixel, a pixel that neighbors the interest pixel is set as the next interest pixel, as indicated by "×" in FIG. 4B, and a 7×7 area is set to have the pixel indicated by "×" as the interest pixel, so as to similarly execute a correction process. After that, the interest pixel is similarly shifted pixel by pixel in turn and a new 7×7 area is set in each case, thus correcting all pixels to be corrected.

A case will be explained below wherein the process unit is an area unit. A 7×7 area is set for a pixel indicated by "○" in FIG. 4A, and a correction strength to be set for "○" is applied to a plurality of pixels, e.g., all pixels, in the 7×7 area. As the next process unit, a 7×7 area is set for a pixel indicated by "Δ" in FIG. 4C. In this way, the process unit is shifted, so that the 7×7 area for "○" neighbors the 7×7 area for "Δ". However, the pixel unit is preferably used as the process unit so as to set the correction strength at higher accuracy. In the embodiments to be described hereinafter, the pixel unit will be described as the process unit.

Figure 5:
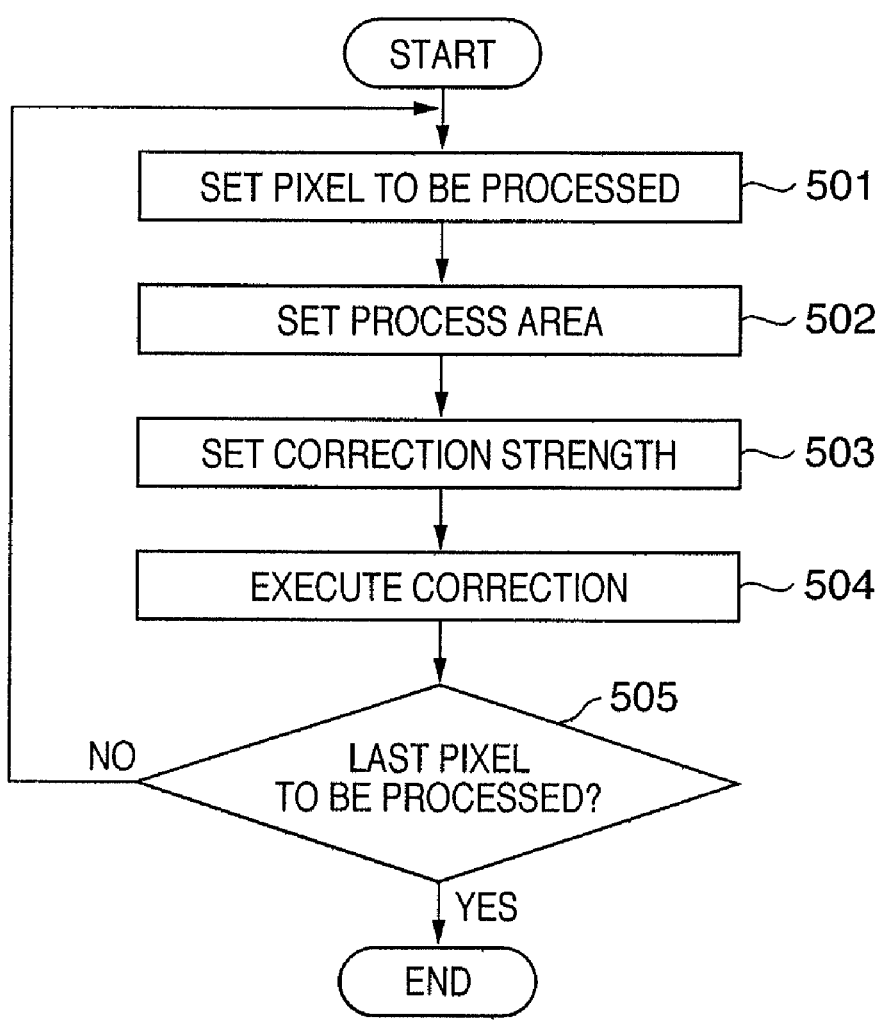
FIG. 5 is a flowchart of the operation for shifting the process unit according to the embodiments of the present invention.

FIG. 5 is a flowchart for explaining the operation for shifting the process unit. Step 501 is a setting process of a process target (pixel to be processed). After the start of the process, the first pixel to be processed is set. If the process returns from step 505 to step 501, the next pixel to be processed is set.

In step 502, a process area is set. The process area is an area configured by a plurality of pixels (7×7 area in the above description) including the pixel to be processed, as described above.

In step 503, a correction strength is set. That is, a correction strength for the pixel to be processed, is set. In step 504, the pixel to be processed is corrected using the correction strength set in step 503. In step 505, it is determined whether or not the processed pixel is the last pixel to be processed, that is, it is checked if the processed pixel to be processed is the last one. If the pixel to be processed is not the last one (NO), the process returns to step 501. If the processed pixel is the last one (YES), this process ends.

In a replacement process in the embodiments to be described hereinafter, the 7×7 area will be described as the process area. This is because the pixel range of a document to be scanned by one pixel of the image sensing element (CCD or CIS) used in the scanning device 34 described using FIG. 1B and the scanning unit 14 described using FIG. 2 is designed to include six pixels or less. Although the pixel range to be scanned is designed to include six pixels or less, reflected light from a document that enters the image sensing element is influenced in various ways due to float of a document from the document table, unevenness of a document, and the like. For this reason, one pixel of the image sensing element may scan a range exceeding six pixels in practice. The embodiments to be described hereinafter show a plurality of graphs used to explain image signals obtained by scanning a document. However, these image signals are not always obtained from reflected light within six pixels or less. FIGS. 6A and 6B simply illustrate the range of reflected light that comes from a document and enters one pixel of the image sensing element.

As shown in FIG. 6A, the image sensing element used in this embodiment is designed so that reflected light within six pixels from a 7-pixel range of a document enters one pixel of the image sensing element (as described above, reflected light that exceeds six pixels may enter in some cases). That is, reflected light from one pixel on a document influences seven pixels of the image sensing element. This causes edge blurring described in the paragraphs of "related art", and deteriorates sharpness.

One of objects of the embodiments to be described hereinafter is to reduce blurring. For example, in the second embodiment to be described later, an edge is enhanced by replacing an interest pixel with a replacement candidate pixel. Therefore, by selecting a replacement candidate from a pixel area less influenced by a document pixel corresponding to the interest pixel, the edge enhancing effect can be improved. For this reason, in order to ensure a minimum area which is influenced by one pixel of a document image as the process area, the 7×7 area is set as the process area.

However, in order to improve the edge enhancing effect more, it is effective to set an area exceeding 7×7 pixels as a reference area. Also, when one pixel of the image sensing element is designed to receive reflected light from a 3-pixel range of a document, as shown in FIG. 6B, the process area may be set as small as a 3×3 area. In this manner, the reference area can be set as suitable in accordance with the performance of the image sensing element such as the number of pixels of the image sensing element influenced by one pixel of a document image, the spot size, the number of blurred pixels, Modulation Transfer Function (MTF), and the like.

First Embodiment

The first embodiment of the present invention will be described below. The first embodiment is directed to an image processing apparatus, and can be applied not only to the printing device but also to apparatuses such as a display device, scanner device, FAX sending device, and the like, which handle scan images including both text and photographs.

As described above, the image processes according to the first embodiment suitably function when they are performed in step 303 in FIG. 3.

Figure 10A:
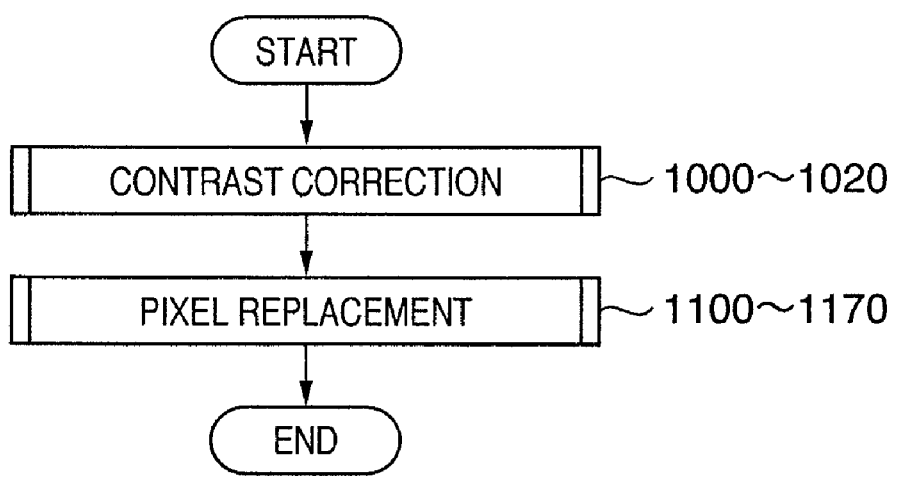
FIGS. 10A to 10C are flowcharts for explaining the operations according to the first embodiment of the present invention.
Figure 10B:
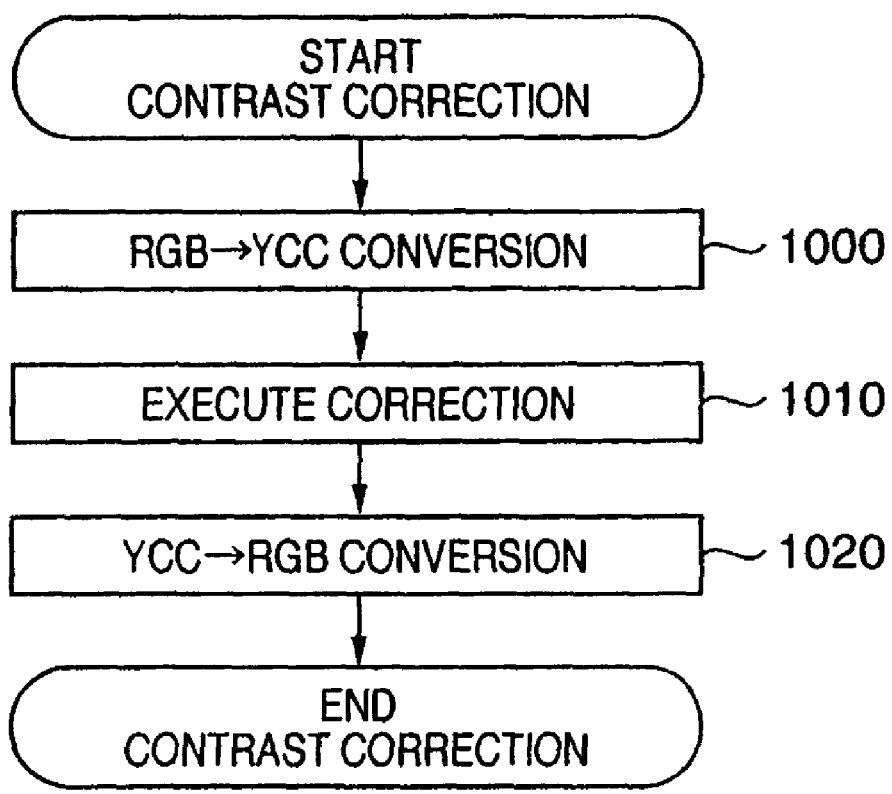
Figure 10C:
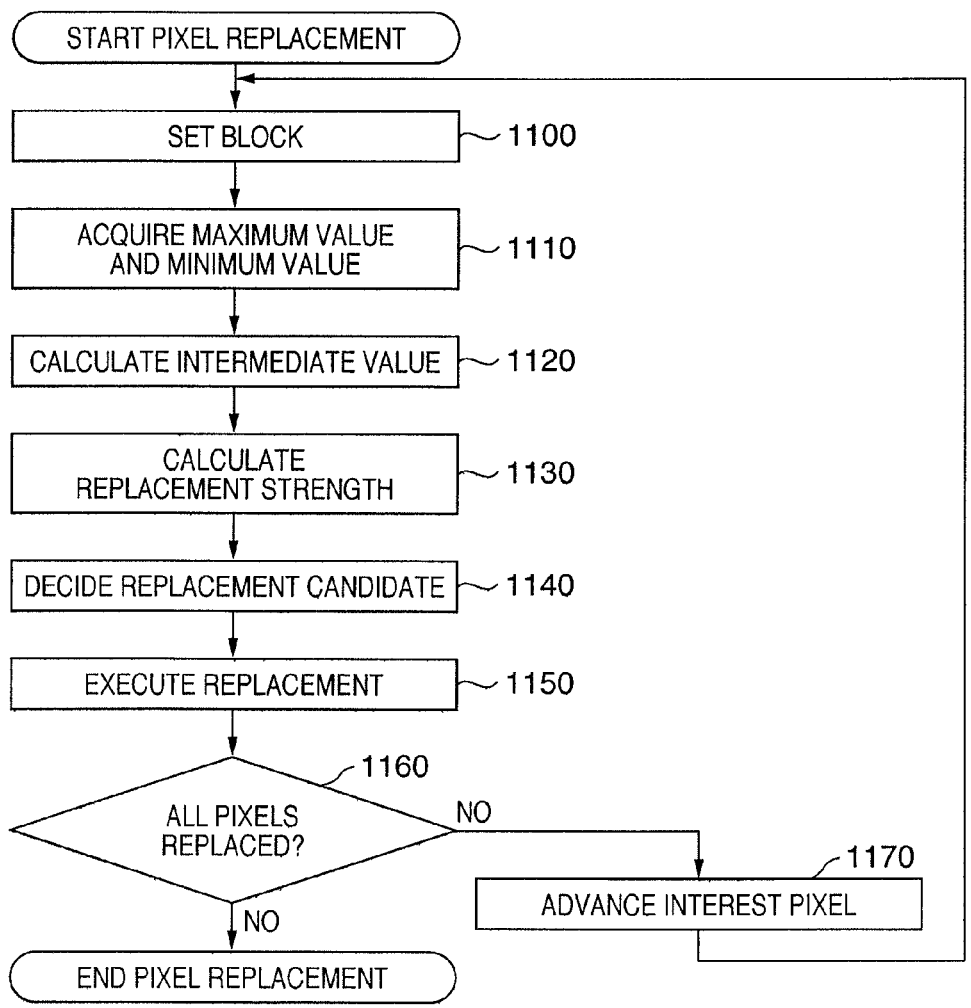

FIGS. 10A, 10B, and 10C are flowcharts for explaining the operation of the first embodiment. The following explanation will be given along respective steps described in these flowcharts.

After the start of the process in FIG. 10A, a contrast correction process is started in steps 1000 to 1020. FIG. 10B shows details of the contrast correction process. After the start of the process, in step 1000 color space conversion is executed for all pixels of an input image configured by sRGB (8 bits per color) image signals to obtain luminance and color difference component values of the pixels. Note that a YCC color space is used as the color space of a conversion destination. A luminance Y (8 bits), color difference Cb (8 bits), and color difference Cr (8 bits) are calculated according to:

$$Y = 0.29891 \times R + 0.58661 \times G + 0.11448 \times B \quad (1)$$

$$Cb = -0.16874 \times R - 0.33126 \times G + 0.50000 \times B \quad (2)$$

$$Cr = 0.50000 \times R - 0.41869 \times G - 0.08131 \times B \quad (3)$$

Figure 15:
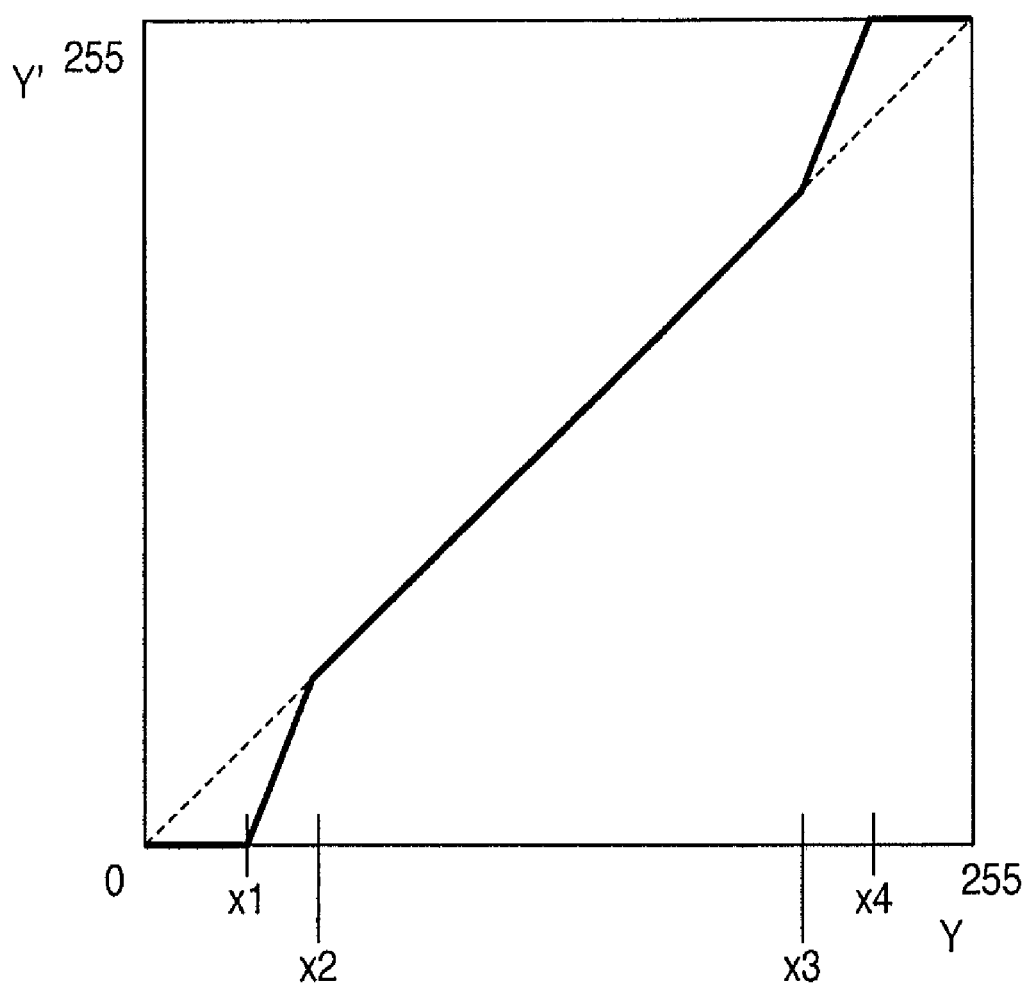
FIG. 15 is a graph of input/output conversion characteristics of contrast correction according to the first embodiment of the present invention.

The process advances to step 1010, and corrects the contrast of the luminance values Y of all the pixels calculated in step 1000 according to the input/output characteristics represented by the graph in FIG. 15. Thus under-color removal and black removal processes are performed and new luminance values Y' is obtained. As an implementation method in this embodiment, a one-dimensional lookup table using an 8-bit input and 8-bit output is used.

In the graph shown in FIG. 15, the abscissa plots input luminance values Y, and the ordinate plots output luminance values Y'. For an input that meets ×2<Y<×3, Y'=Y is defined, and tonality is reserved between the input and output luminance values. For an input that meets 0≦Y≦×1, Y'=0 is defined to convert the input luminance value to a lowest luminance value. For an input that meets ×4<Y≦255, Y'=255 is defined to convert the input luminance value to a highest luminance value. For an input that meets ×1≦Y≦×2, Y' undergoes linear tone conversion from 0 to ×2. For an input that meets ×3≦Y≦×4, Y' undergoes linear tone conversion from ×3 to 255. The under-color removal and black removal processes to be executed in this embodiment can be implemented as long as the table contents decrease a luminance value to be output in response to a low-luminance input, and increase a luminance value to be output in response to a high-luminance input. Hence, tables having the input/output relationships other than FIG. 15 may be used. However, in order to avoid the influence on tonality of halftone, it is more desirable to output a luminance value equal to a middle-luminance input for such input.

The number of table entries of the one-dimensional lookup table need not always be the number of tones (in this embodiment, 8 bits=256 tones) of input luminance values. The table may have the number of entries (e.g., 6 bits=64 tones) smaller than the number of tones of input luminance values, and correction may be applied by interpolation.

The one-dimensional lookup table need not always be a table for all the input luminance values. For example, a table for only luminance values of the background part and black part may be prepared, and other input luminance values may be processed to yield the input value=the output value without looking up the table.

The implementation method of contrast correction is not limited to the process using the one-dimensional lookup table. For example, the input/output function may be defined, and correction may be implemented by calculation processes.

Referring back to FIG. 10B, in step 1020 R', G', and B' (8 bits per color) are calculated for all the pixels of the input image configured by Y'CbCr (8 bits per color) image signals obtained in steps 1000 and 1010 according to:

$$R' = Y' + 1.40200 \times Cr \quad (4)$$

$$G' = Y' - 0.34414 \times Cb - 0.71414 \times Cr \quad (5)$$

$$B' = Y' + 1.77200 \times Cb \quad (6)$$

If each of the R', G', and B' values is less than 0, that value is set to be 0; if it is equal to or larger than 256, that value is set to be 255. For a pixel of Y'=0, R'=G'=B'=0 is set; for a pixel of Y'=255, R'=G'=B'=255 is set.

With the above processes, the RGB values (8 bits per color) that have undergone the under-color removal and black removal processes are obtained. In this way, the contrast correction process is completed.

Note that the first embodiment uses the sRGB color space as the input RGB color space. Alternatively, other standard RGB color spaces such as AdobeRGB and the like may be used, and an RGB color space unique to the printer according to the present invention may be used. The first embodiment executes conversion onto the YCC color space to implement contrast correction. However, color conversion to other color spaces may be executed as long as it can separate a luminance component and color difference components of an input pixel. For example, conversion to an L*a*b* color space or LUV color space may be executed. A color space that approximately expresses these color spaces may be used for the sake of simple calculations in place of using these color spaces intact. Also, contrast correction may be applied to R, G, and B channels without any color space conversion for the sake of simple calculations.

The configuration of image signals of an input image is not limited to RGB signals. For example, other configurations such as YCC signals and the like may be used. In such case, these pixel values are converted onto other color spaces as needed to implement contrast correction.

The pixel replacement process will be described below using the flowchart shown in FIG. 10C.

The process advances to step 1100, and a block of a 7×7 area is set including seven pixels in the horizontal direction and seven pixels in the vertical direction to have the interest pixel as the center in an image configured by RGB (8 bits per color) image signals obtained in step 1020. Then, a block of a 7×7 area of Y is set by calculating luminance values Y (8 bits) from respective pixel values of the set block by:

$$Y = 0.29891 \times R + 0.58661 \times G + 0.11448 \times B \quad (7)$$

Note that the first embodiment uses luminance Y given by equation (7), but may adopt luminance L or other values as long as that value can express a brightness component of a pixel. For example, a value that approximately expresses luminance or lightness may be used for the sake of simple calculations. Next, in step 1110 a maximum value YMax and minimum value Ymin are acquired from the Y values calculated in step 1100. Also, pixel values RGBMax of the pixel that assumes YMax, and pixel values RGBmin of the pixel that assumes Ymin, are acquired together. Note that both RGBMax and RGBmin are matrices having R, G, and B as elements. In step 1120, an intermediate value Ymid of Y is calculated using:

$$Ymid=(YMax-Ymin)/2 \qquad (8)$$

Subsequently, in step 1130 a replacement strength k is calculated by:

$$k=\{(YMax-Ymin)-YThd1\}/\{YThd2-YThd1\} \qquad (9)$$

where YThd1 and YThd2 are arbitrary constants which assume values ranging from 0 to 255, and meet the condition YThd2>YThd1.

If k<0, k=0 is set; if k>1, k=1 is set.

With the above process, if the luminance difference between YMax and Ymin is less than YThd1, k=0 is set; if the luminance difference between YMax and Ymin is equal to or larger than YThd2, k=1 is set. On the other hand, if the luminance difference between YMax and Ymin falls within the range larger than YThd1 and smaller than YThd2, k linearly changes according to the luminance difference between YMax and Ymin.

In the first embodiment, assume that YThd1=50 and YThd2=200. It is determined that an area in which the luminance difference between YMax and Ymin is less than 50 includes a photograph image expressed by continuous tones, and the replacement strength k is set to be zero. Also, it is determined that an area in which the luminance difference between YMax and Ymin is equal to or larger than 200 includes a character edge part, and the replacement strength k is set to be 1.

By appropriately setting the YThd1 and YThd2 values in correspondence with the luminance characteristics of an input image, and the scanner characteristics, copy operation modes, and the like of the MFP 1 that comprises the image processing apparatus according to the present invention, this embodiment can be suitably practiced. As the next process, in step 1140 the CPU 11 decides an replacement candidate RGBex based on the relationship between the intermediate value Ymid calculated in step 1120 and Yp of the interest pixel.

If Yp≦Ymid, RGBex=RGBmin is decided; if Yp>Ymid, RGBex=RGBMax is decided. In step 1150, the CPU 11 replaces pixel values RGBp of the interest pixel by RGBp' using:

$$RGBp'=k \times RGBex+(1-k) \times RGBp \qquad (10)$$

where RGBp is a matrix having R, G, and B as elements of the interest pixel.

After execution of the replacement process, if it is determined in step 1160 that the replacement process for all the pixels in the image is completed, the pixel replacement process ends; otherwise, the process advances to step 1170. In step 1170, the coordinates of the interest pixel are advanced and the process returns to step 1100 to repeat the aforementioned processes until the replacement process for all the pixels in the image is completed.

Application of First Embodiment

In this embodiment, the bit precision of all signal values of RGB, YCC, and the like is 8 bits for the sake of descriptive convenience. Of course, other numbers of bits may be used in correspondence with the formats of input and output images, and to improve the precision of intermediate calculations.

In this embodiment, the replacement process is done for RGB. Alternatively, the replacement process may be applied to YCC values, and RGB values may be calculated after the replacement process.

In the first embodiment, the intermediate value Ymid is calculated from YMax and Ymin. Alternatively, an average value or intermediate value of Y of all the pixels in the block may be used as Ymid.

In the first embodiment, the replacement process is executed after the contrast correction is applied to all the pixels. Alternatively, upon completion of the contrast correction for 7×7 pixels required for the replacement process, the corrected pixels may undergo the replacement process. Also, by independently assigning hardware resources (CPU, DSP, etc.) that execute respective processes, these processes may be performed by pipeline processes.

In the first embodiment, the replacement process is applied to the pixel values after the contrast correction. However, if the contrast correction process is done after the replacement process, the same effects as above can be obtained. Hence, such order of processes may be adopted.

EFFECTS OF FIRST EMBODIMENT

The first embodiment can obtain the aforementioned effects of the present invention.

Furthermore, in the first embodiment, since the replacement process is executed using the replacement strength, which is decided depending on the luminance difference of surrounding pixels of the interest pixel, an intermediate color is removed by a strong replacement process around a character edge with the large luminance difference, and a weak replacement process is applied or replacement process is skipped with respect to a part with a small luminance difference, thus suitably preventing the bad effect due to replacement.

Second Embodiment

The second embodiment of the present invention will be described below. As described in the first embodiment, the image processes of the present invention comprise the contrast correction process and replacement process. The second embodiment will explain another embodiment of the replacement process.

The second embodiment is directed to an image processing apparatus, and can be applied not only to the printing device but also to apparatuses such as a display device, scanner device, FAX sending device, and the like, which handle scan images including both text and photographs.

As described above, the image processes according to the second embodiment suitably function when they are performed in step 303 in FIG. 3.

Figure 11A:
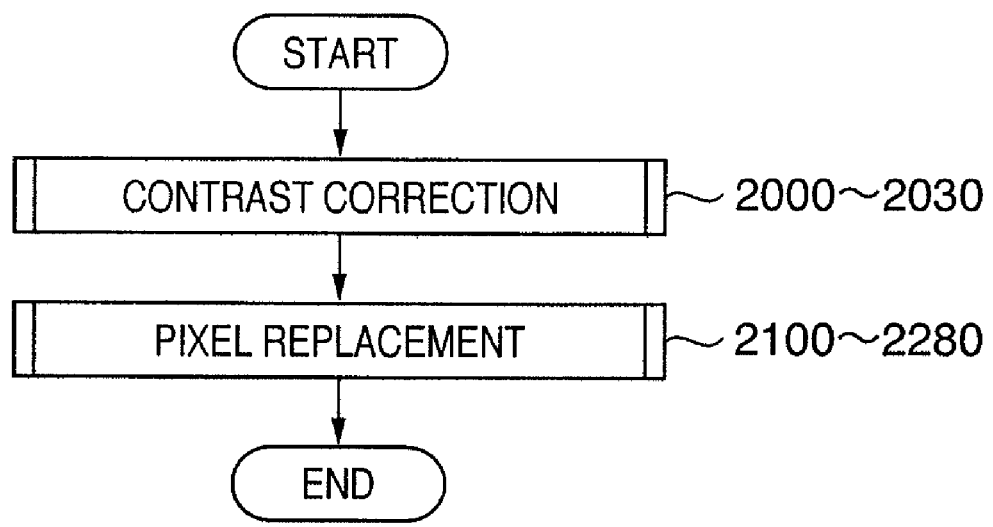
FIGS. 11A and 11B are flowcharts for explaining the operations according to the second embodiment of the present invention.
Figure 11B:
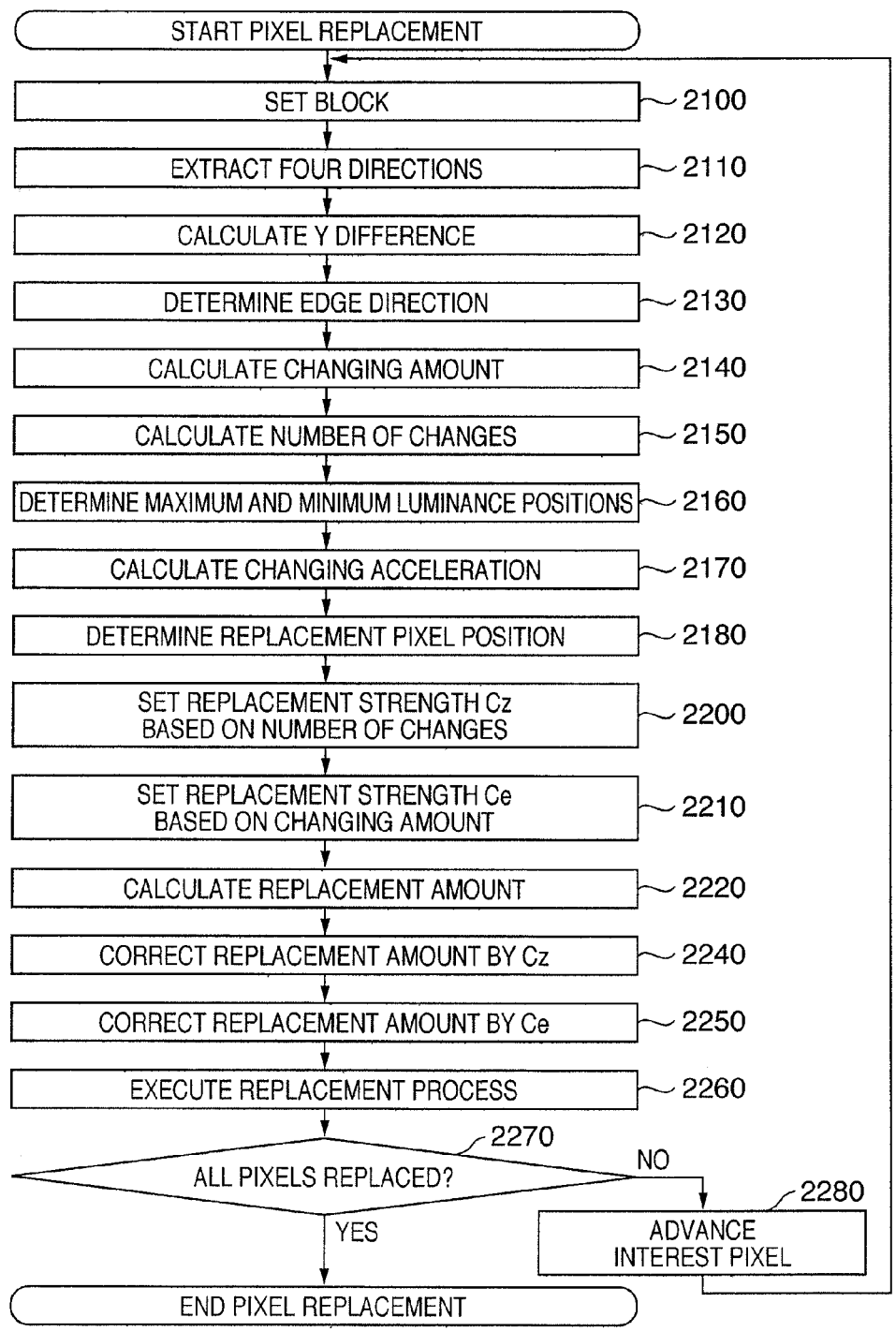

FIGS. 11A and 11B are flowcharts for explaining the operations of the second embodiment. The following description will be given along respective steps described in the flowcharts.

After the start of the process in FIG. 11A, a contrast correction process starts in steps 2000 to 2030. Since this process is the same as steps 1000 to 1020 of the first embodiment shown in FIG. 10B, a repetitive description thereof will not be given. After completion of this contrast correction process, a pixel replacement process is executed in steps 2100 to 2260. After the start of the pixel replacement process, in step 2100 a block of a 7×7 area is set including seven pixels in the horizontal direction and seven pixels in the vertical direction to have the interest pixel as the center in an image configured by RGB (8 bits per color) image signals obtained in step 2020. Then, a block of a 7×7 area of Y is set by calculating luminance values Y (8 bits) from respective pixel values of the set block by:

$$Y=0.29891 \times R+0.58661 \times G+0.11448 \times B \quad (11)$$

Figure 16A:
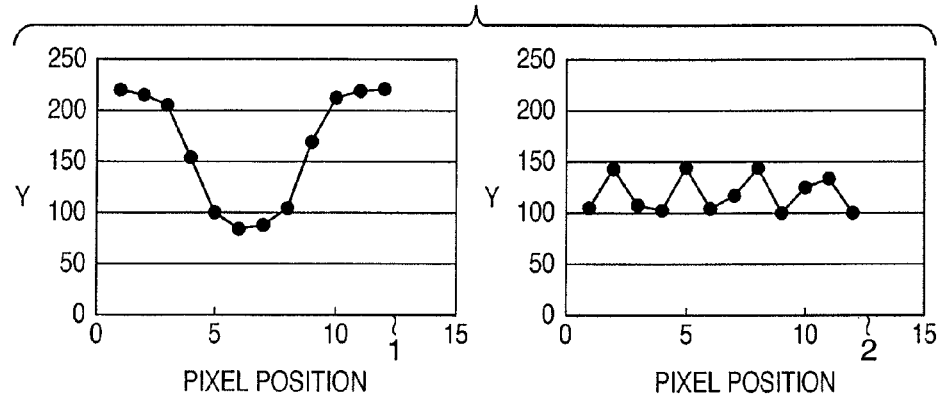
FIGS. 16A to 16C are graphs for explaining the luminance, luminance difference, and luminance changing acceleration according to the second embodiment of the present invention.

Graph 1 of FIG. 16A shows luminance values upon scanning a black vertical line in a white background in the horizontal direction. Graph 2 of FIG. 16A shows luminance values upon scanning halftone dots, that line up in the horizontal direction in a white background, in the horizontal direction.

Note that the second embodiment uses luminance Y given by equation (11), but may adopt other values as long as that value can express a brightness component of a pixel. For example, an L*a*b* color space or LUV color space may be used, or a color space that approximately expresses these color spaces may be used for the sake of simple calculations in place of using these color spaces intact.

The second embodiment uses the process area size defined by 7×7 pixels. However, as described in the paragraphs of the image process unit, the process area size may be defined by the numbers of pixels other than 7×7 pixels as needed.

Figure 14:
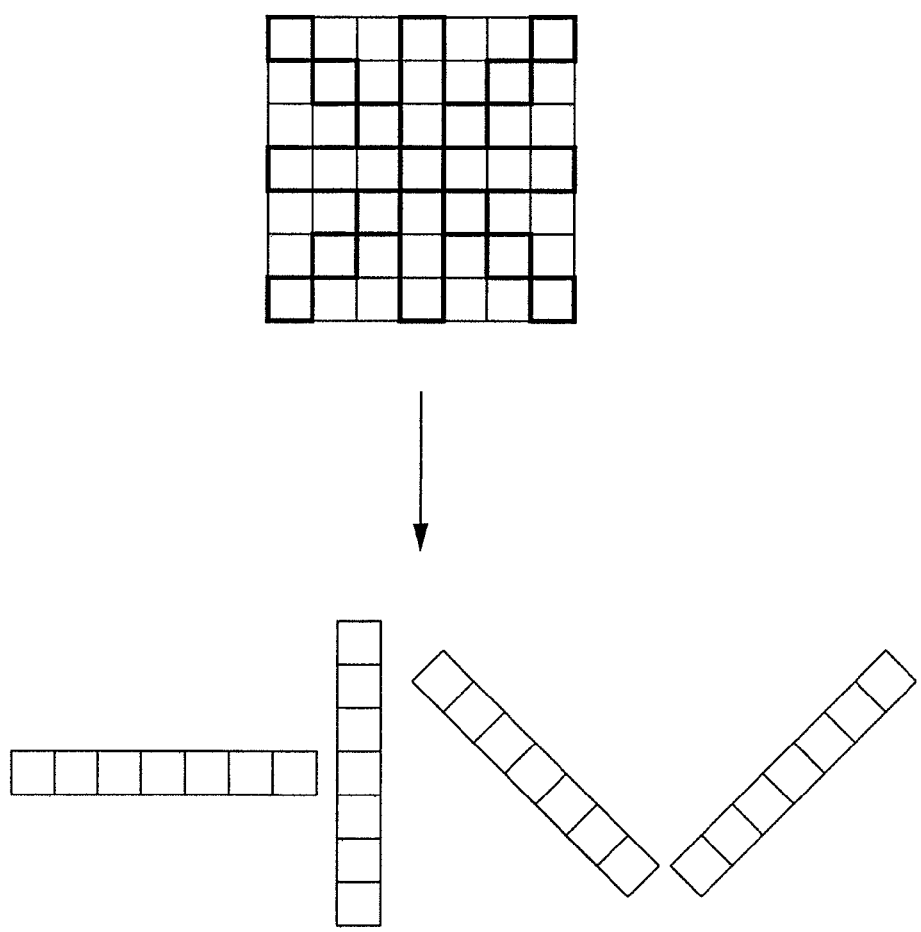
FIG. 14 is an explanatory view of four-direction extraction according to the second embodiment of the present invention.
Figure 17:
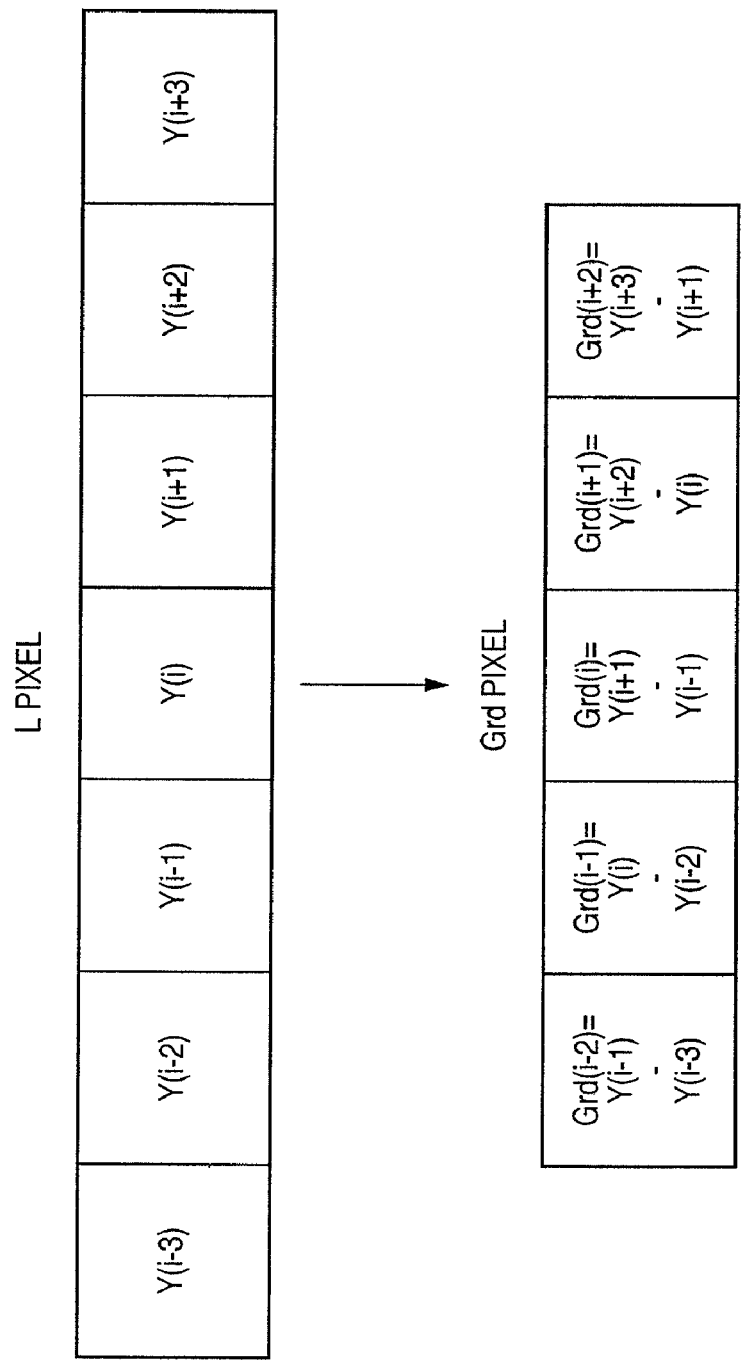
FIG. 17 is an explanatory view of the luminance difference according to the second embodiment of the present invention.

Referring back to FIG. 11B, the process then advances to step 2110, and from the process area of Y generated in step 2100, seven pixels in each of a total of four directions are extracted, that is, one horizontal direction, one vertical direction, and two oblique directions, as shown in FIG. 14. In step 2120, differences Grd of Y of five pixels in each direction are calculated from those in the four directions extracted in step 2110, as shown in FIG. 17, and using:

$$Grd(i)=Y(i+1)-Y(i-1) \quad (12)$$

where Y(i−1) is that of a pixel before pixel Y(i), and Y(i+1) is that of a pixel after pixel Y(i).

Figure 16B:
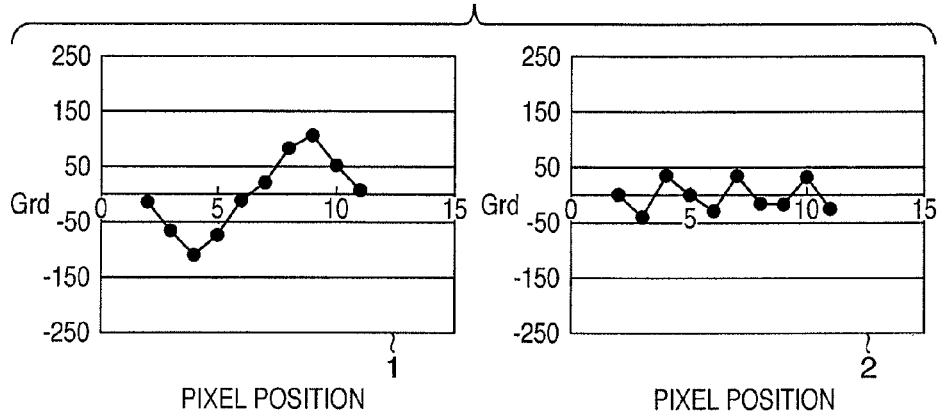

Note that the Y difference calculation method is not limited to such specific method. For example, differences between neighboring pixels may be calculated, or differences between pixels further separated from those before and after a given pixel described above may be calculated. Graphs 1 and 2 of FIG. 16B show the differences Grd calculated by applying equation (12) to Y in graphs 1 and 2 of FIG. 16A. In step 2130, Grd absolute values in the four directions are calculated at the position of the interest pixel in the differences Grd of the four directions calculated in step 2120. A direction that shows a maximum Grd absolute value of those in the four directions is determined as an edge direction of the interest pixel. In step 2140, as a changing amount (edge amount) of the interest pixel, a maximum absolute value is calculated from five pixels of the differences Grd of the edge direction calculated in step 2120 in the edge direction determined in step 2130. An edge is stronger with increasing changing amount, and is close to flat with decreasing changing amount. Furthermore, in step 2150 the number of changes as a total of those in the four directions is calculated from the differences Grd in the four directions calculated in step 2130.

Figure 18A:
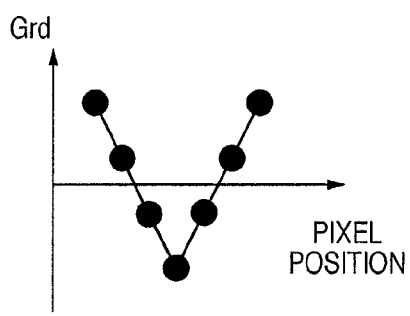
FIGS. 18A to 18D are graphs for explaining the number of changes according to the second embodiment of the present invention.
Figure 18B:
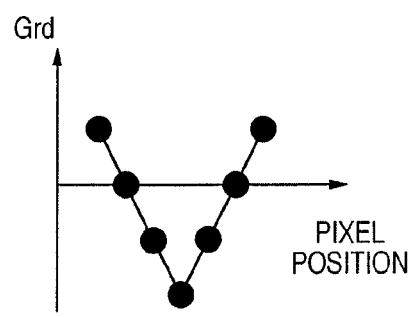
Figure 18C:
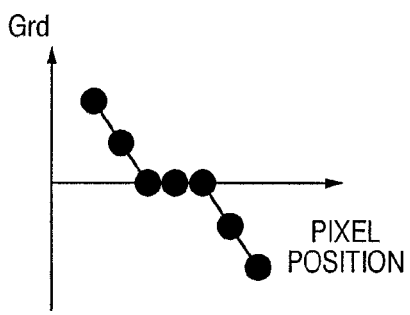
Figure 18D:
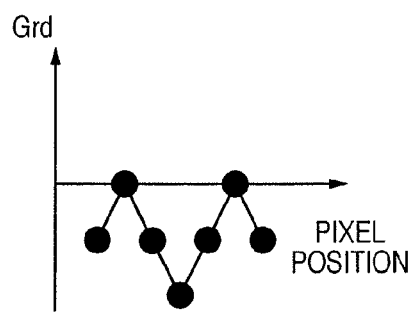

As the number of changes (the number of zero-crossing points) of the interest pixel, the number of changes of the sign of the primary derivative from + to − or vice versa (FIG. 18A), and the number of changes of the sign of the primary derivative from + to 0 and then to − at the next pixel, or from − to 0 and then to + at the next pixel (FIG. 18B) are calculated. In step 2160, pixel positions with maximum Y and minimum Y are determined from seven pixels of Y of the edge direction of the four directions extracted in step 2110 in the edge direction determined in step 2130.

In step 2170, a changing acceleration Lap of three pixels is calculated from the differences Grd of the edge direction calculated in step 2120 in the edge direction determined in step 2130. The method of calculating the changing acceleration Lap is described by:

$$Lap(i)=Grd(i+1)-Grd(i-1) \quad (13)$$

where Grd(i−1) is a pixel before pixel Grd(i), and Grd(i+1) is a pixel after that pixel. Graphs 1 and 2 in FIG. 16C respectively show the changing accelerations Lap calculated by applying equation (13) to Grd in graphs 1 and 2 in FIG. 16B.

Note that the calculation method of the changing acceleration is not limited to this. For example, a difference between neighboring Grd values may be calculated.

Figure 16C:
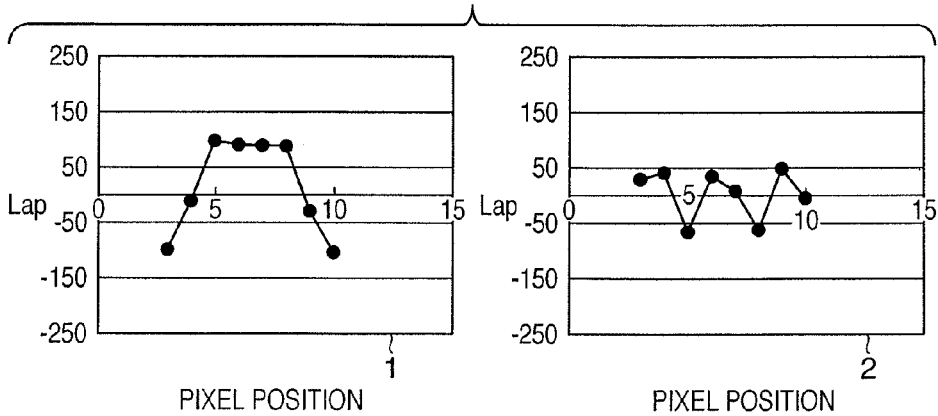

In step 2180, a replacement pixel position is determined based on the pixel positions with maximum Y and minimum Y determined in step 2160 and the changing acceleration Lap calculated in step 2170. As shown in FIG. 16C, when the sign of the changing acceleration Lap is +, Y of the interest pixel tends to assume a value, the absolute value of which is closer to minimum Y than to maximum Y; when the sign of the changing acceleration Lap is −, Y of the interest pixel tends to assume a value, the absolute value of which is closer to maximum Y than to minimum Y. Hence, as shown in Table 1 below, since a replacement pixel position is determined with respect to the sign of the changing acceleration Lap, the interest pixel can be replaced by an appropriate replacement candidate pixel.

In the second embodiment, the replacement pixel position is determined as shown in Table 1. However, handling of the edge center at which the changing acceleration Lap of the interest pixel becomes zero is not limited to Table 1. If the changing acceleration Lap of the interest pixel is zero, that pixel position may be replaced by that of maximum Y or by that of minimum Y.

TABLE 1

Relationship between changing acceleration sign and replacement pixel position

| Lap Sign of Interest Pixel | Total Lap Sign of Previous and Next Pixels | Replacement Pixel Position |
|---|---|---|
| + |  | Minimum Y |
| − |  | Maximum Y |
| 0 | + | Minimum Y |
| 0 | − | Maximum Y |
| 0 | 0 | Maximum Y |

Figure 12A:
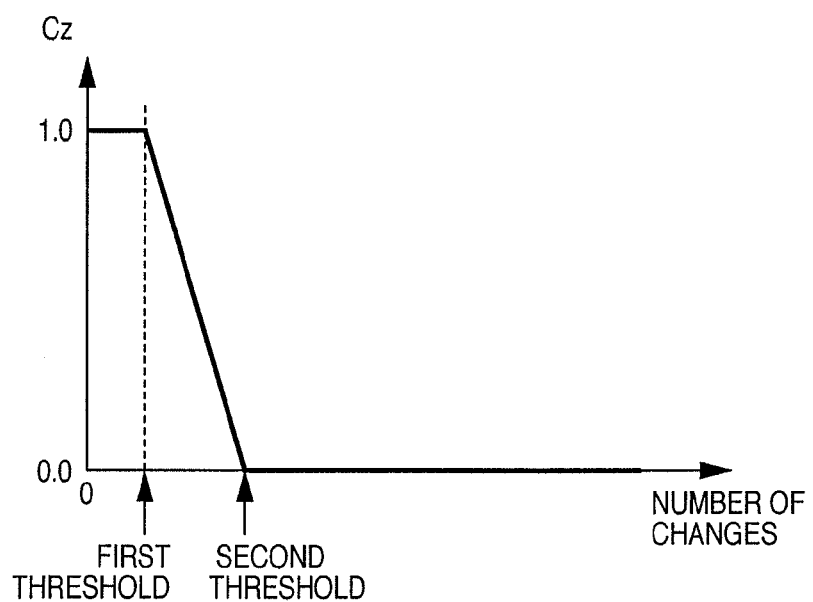
FIGS. 12A and 12B are graphs for explaining the correction strength setting according to the second embodiment of the present invention.

The process then advances to step 2200, and a replacement strength Cz is adaptively set in accordance with the number of changes calculated in step 2150. FIG. 12A is a graph for explaining the setting process of the replacement strength Cz in step 2200: the abscissa plots the number of changes, and the ordinate plots the replacement strength Cz. In case of the number of changes which has a high probability of a text area and is smaller than a first threshold, the replacement strength Cz=1 is set to enhance the edge. In case of the number of changes which has a high probability of a halftone dot area with high LPI and is larger than a second threshold, the replacement strength Cz=0 is set so as not to deform a halftone dot pattern by the replacement process. In case of the number of changes falling within a range between the first and second thresholds (both inclusive), a different replacement strength Cz is adaptively set for each number of changes to obscure switching of the processes, so that the replacement strength Cz=1 when the number of changes=the first threshold, and the replacement strength Cz=0 when the number of changes=the second threshold. More specifically, Cz can adaptively be set by looking up a table expressed by FIG. 12A or using:

$$Cz=(\text{second threshold}-\text{the number of changes})/(\text{second threshold}-\text{first threshold}) \quad (14)$$

Figure 12B:
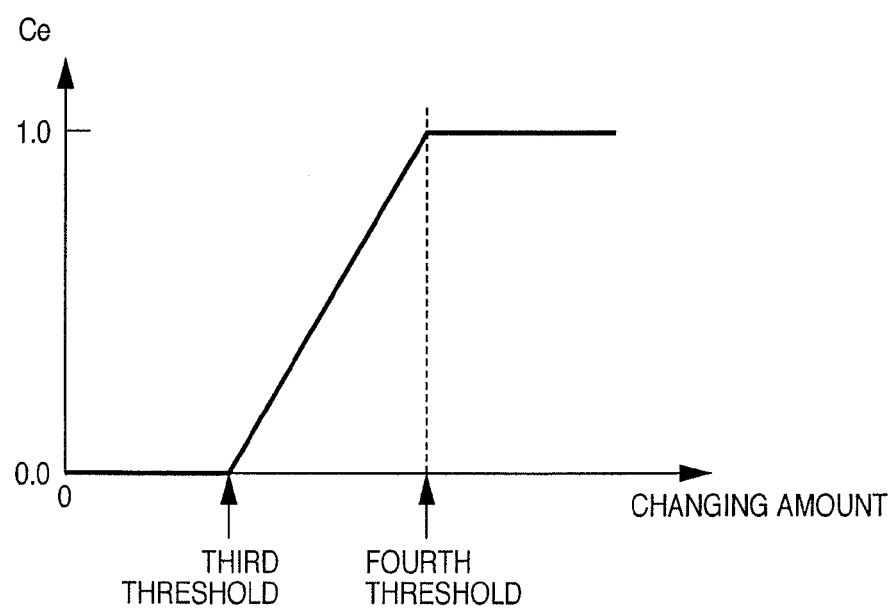

In step 2210, a replacement strength Ce is adaptively set in accordance with the changing amount calculated in step 2140. The replacement strength Ce is adaptively set using third and fourth thresholds based on the characteristics shown in FIG. 12B similar to in step 2200. If the changing amount is smaller than the third threshold, the replacement strength Ce=0 is set. If the changing amount is larger than the fourth threshold, the replacement strength Ce=1 is set. If the changing amount falls within a range between the third and fourth thresholds (both inclusive), Ce can adaptively be set using:

$$Ce=(\text{changing amount}-\text{third threshold})/(\text{fourth threshold}-\text{third threshold}) \quad (15)$$

By appropriately setting the thresholds in steps 2200 and 2210 depending on different purposes, the replacement process can be suitably executed accordingly. Setting examples of the replacement strengths Ce and Cz, and their effects will be described below.

Figure 19A:
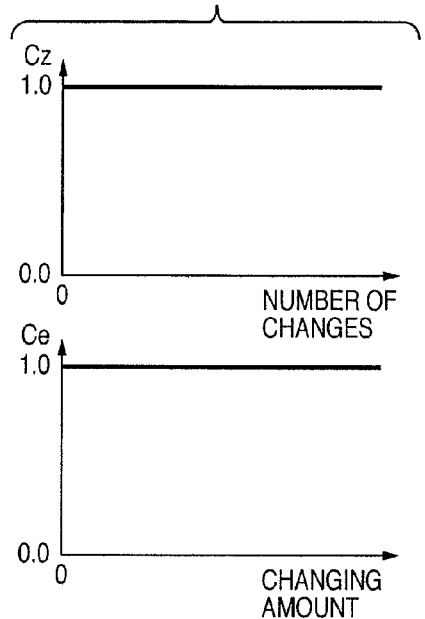
FIGS. 19A to 19D are graphs for explaining an example of the correction strength setting according to the second embodiment of the present invention.

When the replacement strengths Ce and Cz are set as shown in FIG. 19A, the replacement process is done irrespective of the changing amount and the number of changes. With this setting, since a strong replacement process is applied to a document image, it is effective to enhance the edge of the document image including, for example, only black characters.

Figure 19B:
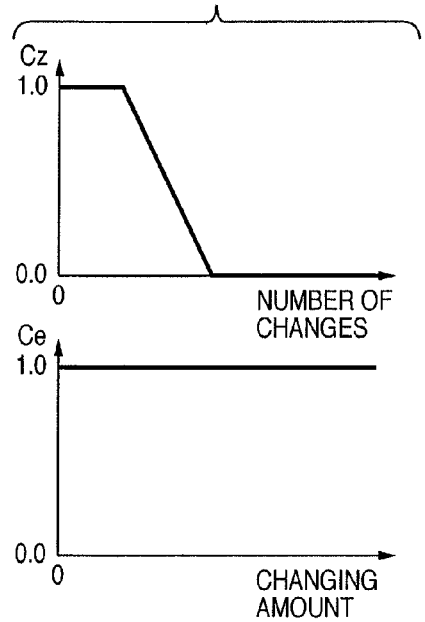

When the replacement strengths Ce and Cz are set as shown in FIG. 19B, the replacement amount changes according to the number of changes. With this setting, upon printing a scan image of a printed document including text and a halftone dot photograph, a halftone dot pattern can be prevented from being disturbed by the replacement process applied to the halftone dot pattern. Also, jaggy or blurring can be prevented from standing out by the replacement process applied to a ruled line part of a document image including many fine ruled lines.

Figure 19C:
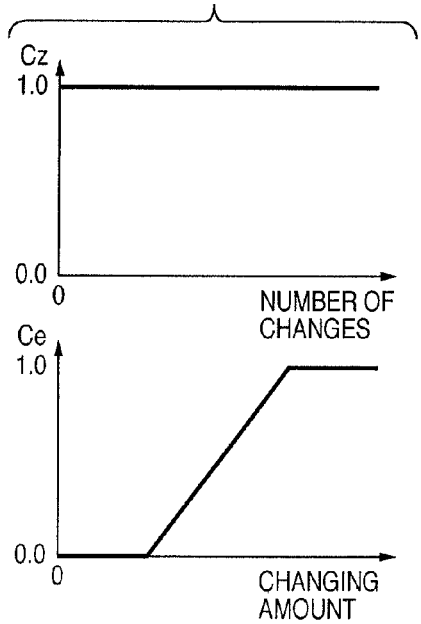

When the replacement strengths Ce and Cz are set as shown in FIG. 19C, the replacement amount changes according to the changing amount. With this setting, upon printing a scan image of a document including text and a photograph with tonality, a photograph part with smooth tones can be prevented from being applied with the replacement process.

Figure 19D:
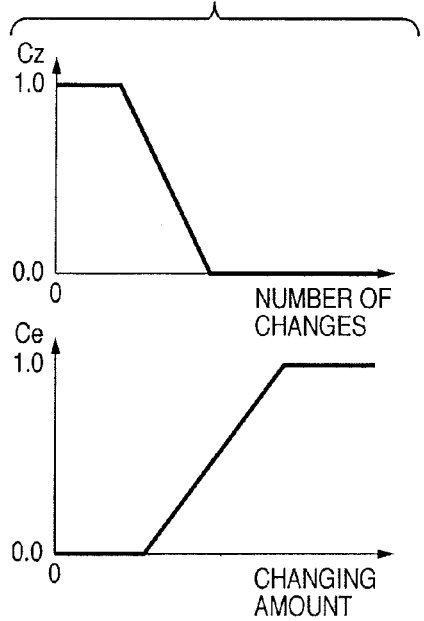

When the replacement strengths Ce and Cz are set as shown in FIG. 19D, the replacement amount changes according to the number of changes and changing amount. With this setting, a text modification process, which can ensure high image quality and can suppress occurrence of the aforementioned image bad effects, can be applied to a broad variety of input images such as text, photograph, halftone dots, fine line, and the like.

Referring back to FIG. 11B, in step 2220 a replacement amount is calculated using the pixel value at the replacement pixel position determined in step 2180. RGB values at the replacement pixel position determined in step 2180 are extracted from the 7×7 RGB areas set in step 2100. Let N0 be the value of the interest pixel, C0 be the pixel value at the replacement pixel position, and ΔC be the replacement amount. Then, the replacement amount ΔC can be calculated using:

$$\Delta C = C0 - N0 \quad (16)$$

Note that the replacement amount ΔC, pixel value C0, and value of the interest pixel N0 are matrices having R, G, and B as elements. Furthermore, the process advances to step 2240, and the replacement amount ΔC, which is calculated in step 2220, is corrected by the replacement strength Cz set in step 2200. A corrected replacement amount ΔCz is calculated using:

$$\Delta Cz = Cz \times \Delta C \quad (17)$$

where the replacement amount ΔCz is a matrix having R, G, and B as elements.

In step 2250, the replacement amount ΔCz, which is calculated in step 2240, is corrected by the replacement strength Ce set in step 2210. A corrected replacement amount Δce is calculated using:

$$\Delta Ce = Ce \times \Delta Cz \quad (18)$$

Note that the replacement amount ΔCe is a matrix having R, G, and B as elements. The process then advances to step 2260, and value of the interest pixel Nc is calculated, which has undergone edge enhancement by means of the contrast correction and replacement processes according to the present invention, by adding the replacement amount ΔCe calculated in step 2250 to the pixel value N0 of the interest pixel, as given by:

$$Nc = N0 + \Delta Ce \quad (19)$$

Note that the value of interest pixel Nc is a matrix having R, G, and B as elements. Note that a process for clipping the value of the interest pixel Nc to fall within a desired range may be inserted. If it is determined in step 2270 that the replacement process for all the pixels in the image is completed, the process ends; otherwise, the process advances to step 2280. In step 2280, the coordinates of the interest pixel are advanced and the process returns to step 2100 to repeat the aforementioned processes until the replacement process for all the pixels in the image is completed.

Effects of Second Embodiment

The second embodiment analyzes the features of a text part more elaborately than the first embodiment, and can further enhance the effects of the first embodiment in the following points.

In the first embodiment, the replacement candidate pixel is selected from 7×7 pixels around the interest pixel. However, in the second embodiment, since the replacement candidate pixel is limited to seven pixels in the text edge direction, the replacement process can be executed without being influenced by pixels in an area irrelevant to the text edge.

In the first embodiment, the replacement strength is decided based on the luminance differences of 7×7 pixels around the interest pixel. However, the second embodiment uses the changing amount and the number of changes of luminance in association with the luminance differences so as to suppress the bad effects on a halftone dot image and fine lines by the replacement process, and can execute the replacement process only for a text part.

In the first embodiment, the replacement destination pixel is decided to have the central value of the luminance differences as a threshold. However, in the second embodiment, since the replacement destination pixel is decided based on the changing acceleration of luminance values around the interest pixel in the edge direction, edge determination can be made with reference to the edge center of a scan image, and the edge of the original image can be recovered more appropriately than the first embodiment.

Third Embodiment

The third embodiment of the present invention will be described below. In the description of the first and second embodiments, the image processes of the present invention comprise the contrast correction process and the replacement process. The third embodiment executes an edge enhancing process by means of filtering in addition to the replacement process.

The third embodiment is directed to an image processing apparatus, and can be applied not only to the printing device but also to apparatuses such as a display device, scanner device, FAX sending device, and the like, which handle scan images including both text and photographs.

As described above, the image processes according to the third embodiment suitably function when they are performed in step 303 in FIG. 3.

Figure 21A:
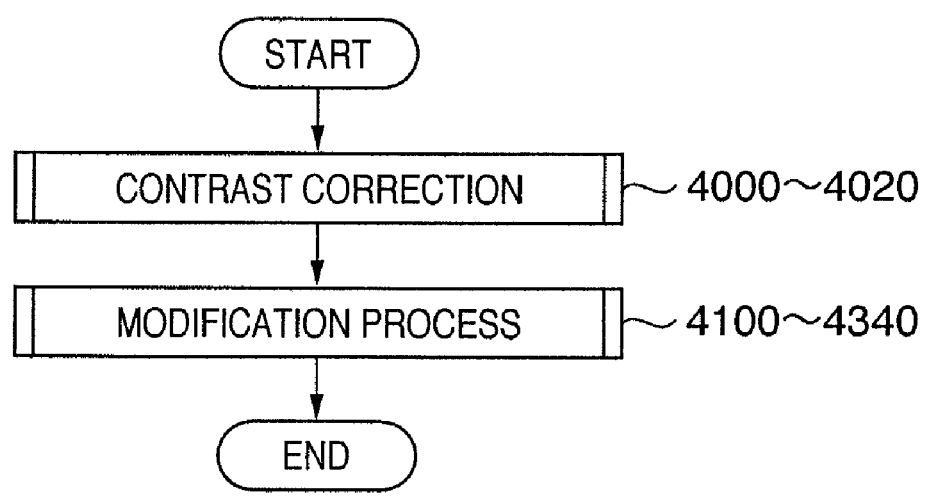
FIGS. 21A to 21C are flowcharts for explaining the operations according to the third embodiment of the present invention.
Figure 21B:
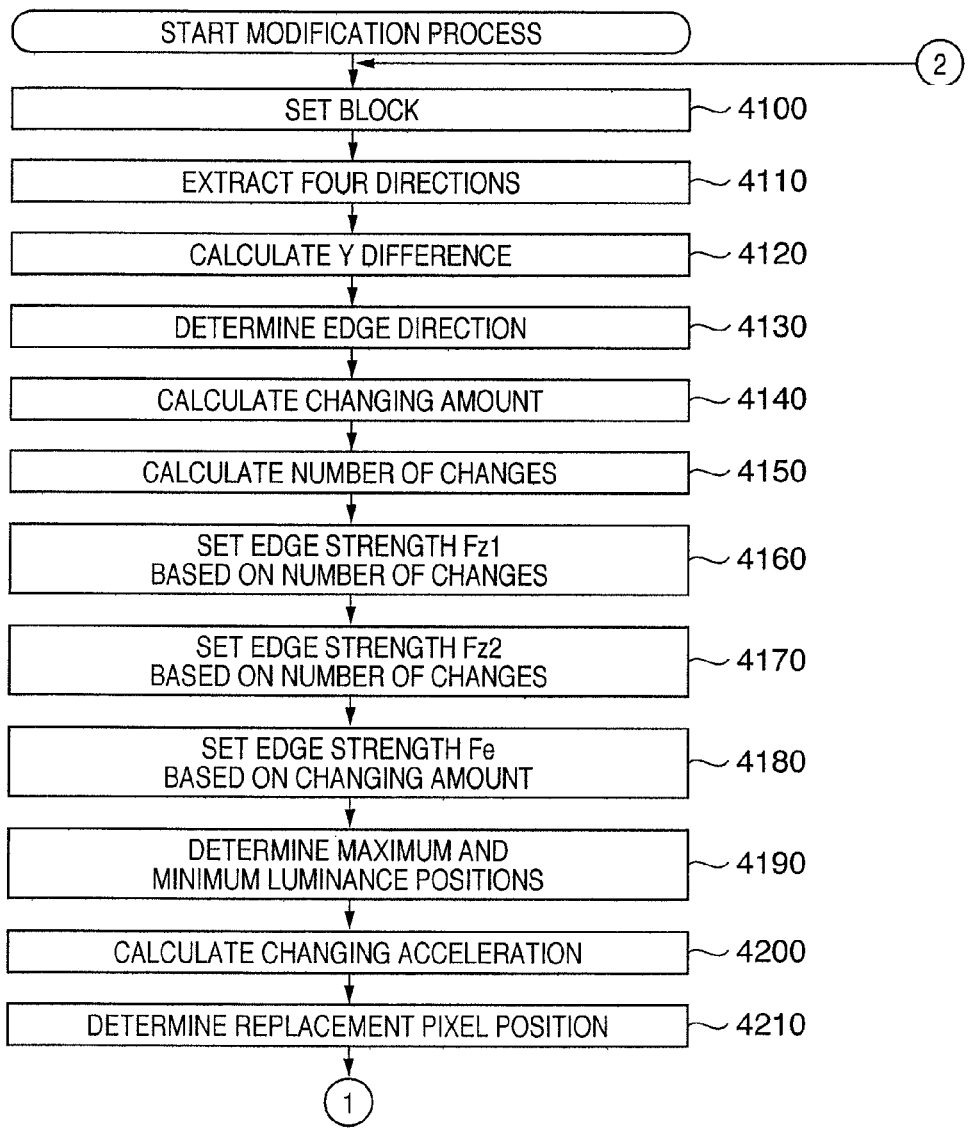
Figure 21C:
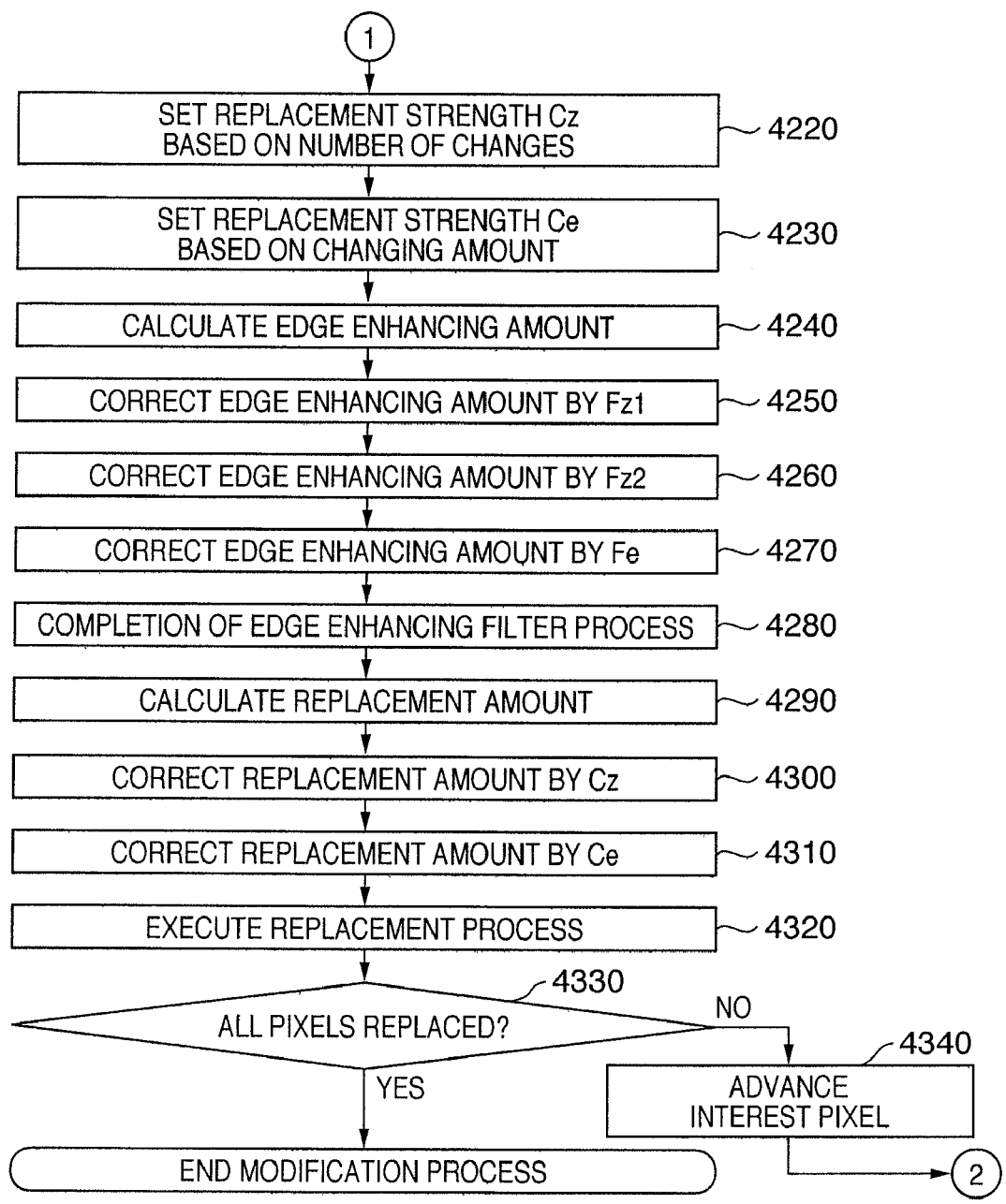

FIGS. 21A and 21B are flowcharts for explaining the operations of the third embodiment. The following description will be given along respective steps described in the flowcharts.

After the start of the process in FIG. 21A, a contrast correction process is executed in steps 4000 to 4020. Since this process is the same as steps 1000 to 1020 of the first embodiment shown in FIG. 10B, a repetitive description thereof will not be given. A modification process is then executed in steps 4100 to 4340.

However, in this modification process, since the process in steps 4100 to 4140 is the same as that in steps 2100 to 2140 in the second embodiment, a repetitive description thereof will be avoided. Therefore, a description will be given from step 4150. In step 4150, the number of changes as a total of those in the four directions is calculated from the differences Grd in the four directions calculated in step 4130. As the number of changes (the number of zero-crossing points) of the interest pixel, the number of changes of the sign of the primary derivative from + to − or vice versa (FIG. 18A), and the number of changes of the sign of the primary derivative from + to 0 and then to − at the next pixel, or from − to 0 and then to +at the next pixel (FIG. 18B) are calculated.

As shown in FIGS. 16A to 16C, a text area tends to have the smaller number of changes than a halftone dot area. However, depending on the density uniformity of a document or shading accuracy, a text area may have a lot of changes with small amplitudes in differences Grd, as shown in FIG. 22A. In such case, the number of changes increases like a halftone dot area, and if a correction strength setting process (to be described later) is executed, an edge strength close to that of the halftone dot area is undesirably set. Hence, when the changing amount calculated in step 4140 is relatively large, that is, when it exceeds a set threshold, small differences Grd are smoothed to zero to set an edge strength with higher accuracy.

More specifically, the changing amount calculated in step 4140 is compared with a threshold (edge threshold), and if the changing amount exceeds the edge threshold, a smoothing threshold is set, as shown in FIG. 22B. In case of Grd absolute values equal to or smaller than the smoothing threshold, the number of changes is counted to have Grd=0, as shown in FIG. 22C. In this manner, the number of changes of the text area can be suppressed, and a high edge strength setting accuracy can be set.

Next, in step 4160 an edge strength Fz1 is adaptively set in accordance with the number of changes calculated in step 4150. FIG. 23A is a graph for explaining the edge strength Fz1 setting in step 4160: the abscissa plots the number of changes, and the ordinate plots the edge strength Fz1. In case of the number of changes which has a high probability of a text area and is smaller than a first threshold, the edge strength Fz1=1 is set to enhance the edge. In case of the number of changes which has a high probability of a halftone dot area that has high LPI and readily causes moiré and is larger than a second threshold, the edge strength Fz1=0 is set so as not to enhance moiré. In case of the number of changes falling within a range between the first and second thresholds (both inclusive), a different edge strength Fz1 is adaptively set for each number of changes to obscure switching of the processes, so that the edge strength Fz1=1 when the number of changes=the first threshold, and the edge strength Fz1=0 when the number of changes=the second threshold. More specifically, Fz1 can adaptively be set with reference to FIG. 23A or using:

$$Fz1 = (\text{second threshold} - \text{the number of changes})/(\text{second threshold} - \text{first threshold}) \quad (20)$$

In step 4170, an edge strength Fz2 is adaptively set in accordance with the number of changes calculated in step 4150. FIG. 23B is a graph for explaining the edge strength Fz2 setting in step 4170: the abscissa plots the number of changes, and the ordinate plots the edge strength Fz2. FIG. 23B aims at attaining FIG. 23C when it is combined with FIG. 23A. As described in step 4150, when the number of changes is zero, a probability of a bold line area is high. When such bold line area undergoes edge enhancement using an edge enhancing filter (to be described later), bordering in which a border part of the bold line area darkens occurs. In order to prevent bordering, in case of the number of changes which has a high probability of a bold line area and is smaller than a third threshold, as shown in FIG. 23B, the edge strength Fz2=0 is set to suppress edge enhancement. In case of the number of changes which has a high probability of a fine line area and is larger than a fourth threshold, the edge strength Fz2=1 is set to apply edge enhancement.

In case of the number of changes falling within a range between the third and fourth thresholds (both inclusive), a different edge strength Fz2 is set for each number of changes to obscure switching of the processes, so that the edge strength Fz2=0 when the number of changes=the third threshold, and the edge strength Fz2=1 when the number of changes=the fourth threshold. More specifically, Fz2 can adaptively be set with reference to FIG. 23B or using:

$$Fz2 = (\text{the number of changes} - \text{third threshold})/(\text{fourth threshold} - \text{third threshold}) \quad (21)$$

Fz1×Fz2 can implement the edge strength shown in FIG. 23C. If bordering is required, the edge strength Fz2=1 can be set irrespective of the number of changes.

In step 4180, an edge strength Fe is adaptively set in accordance with the changing amount calculated in step 4140. FIG. 23D is a graph for explaining the edge strength Fe setting process in step 4180: the abscissa plots the changing amount, and the ordinate plots the edge strength Fe. In case of the changing amount which has a high probability of a flat area and is smaller than a fifth threshold, the edge strength Fe=0 is set so as not to roughen an image by enhancing small changes. In case of the changing amount which has a high probability of an edge area and is larger than a sixth threshold, the edge strength Fe=1 is set to apply edge enhancement. In case of the changing amount falling within a range between the fifth and sixth thresholds (both inclusive), a different edge strength Fe is adaptively set for each changing amount to obscure switching of the processes, so that the edge strength Fe=0 when the changing amount=the fifth threshold and the edge strength Fe=1 when the changing amount=the sixth threshold. More specifically, the CPU 11 can adaptively set Fe with reference to FIG. 23D or using:

$$Fe=(\text{changing amount}-\text{fifth threshold})/(\text{sixth threshold}-\text{fifth threshold}) \quad (22)$$

Since next steps 4190 to 4230 are the same as steps 2160 to 2210 of the second embodiment, a repetitive description thereof will be avoided. Hence, the next explanation will be given from step 4240. In step 4240, differences (edge enhancing amounts) is calculated between the value of the interest pixel upon applying an edge enhancing filter to the 7×7 RGB areas set in step 4100 and that before application, for respective colors. The third embodiment will exemplify a case in which a 5×5 edge enhancing filter is applied to have the interest pixel as the center. However, the filter size need only be equal to or smaller than the process area size set in step 4100, and filter coefficient values may be appropriately set. FIG. 24A shows an example of filter coefficients of a 5×5 edge enhancing filter. Let N0 be a value of an interest pixel, N1 be a value of an interest pixel as a result of application of the filter in FIG. 24A, and ΔF be an edge enhancing amount. The edge enhancing amount ΔF can be calculated by:

$$\Delta F = N1 - N0 \quad (23)$$

When the filter coefficient of the interest pixel is set to be a value obtained by subtracting the filter total value in FIG. 24A from the filter coefficient at the position of the interest pixel in FIG. 24A, as shown in FIG. 24B, the edge enhancing amount ΔF can be calculated by only applying FIG. 24B.

After that, the process advances to step 4250, and the edge enhancing amount ΔF, which is calculated in step 4240, is corrected using the edge strength Fz1 set in step 4160. A corrected edge enhancing amount ΔFz1 is calculated using:

$$\Delta Fz1 = Fz1 \times \Delta F \quad (24)$$

By the process in step 4250, a text area with a small number of changes can undergo relatively strong edge enhancement, and a halftone dot area with a large number of changes can undergo relatively weak edge enhancement. Hence, the sharpness of text can be enhanced, and moiré can be prevented from being enhanced at the same time. In step 4260, the edge enhancing amount ΔFz1, which is calculated in step 4250, is corrected using the edge strength Fz2 set in step 4170. A corrected edge enhancing amount ΔFz2 is calculated using:

$$\Delta Fz2 = Fz2 \times \Delta Fz1 \quad (25)$$

When the edge strength Fz2 is set as shown in FIG. 23B, the process in step 4260 can apply edge enhancement to the bold line area to prevent bordering, and can apply stronger edge enhancement to the fine line area than to the bold line area to enhance the sharpness and increase the density of a black character. Furthermore, the process advances to step 4270, and an edge enhancing amount correction process is executed using the edge strength Fe. In this case, the edge enhancing amount ΔFz2, which is calculated in step 4260, is corrected using the edge strength Fe set in step 4180. A corrected edge enhancing amount ΔFe is calculated using:

$$\Delta Fe = Fe \times \Delta Fz2 \quad (26)$$

By the process in step 4270, the edge area such as a character can undergo relatively strong edge enhancement, and the flat area such as a background or photograph can undergo relatively weak edge enhancement. As a result, the sharpness of a character can be enhanced, moiré can be prevented from being enhanced, and a photograph can be prevented from being roughened at the same time. The process then advances to step 4280, and an edge-enhanced pixel value Ne is calculated according to the third embodiment by adding the edge enhancing amount ΔFe calculated in step 4270 to the interest pixel value N0, as given by:

$$Ne = N0 + \Delta Fe \quad (27)$$

Note that a process for clipping the value Ne that has undergone the edge enhancing filter process to fall within a desired range may be inserted.

Since next steps 4290 to 4310 are the same as steps 2220 to 2250 of the second embodiment, the process in step 4320 will be explained. In this step, an interest pixel value Nc is calculated that has undergone edge enhancement by means of the filter and replacement processes according to the present invention by adding the replacement amount ΔCe, which is calculated in step 4310, to the interest pixel value Ne that has undergone the edge enhancing filter process, as given by:

$$Nc = Ne + \Delta Ce \quad (28)$$

Note that a process for clipping the interest pixel value Nc to fall within a desired range may be inserted.

Since last steps 4330 to 4340 are the same as steps 2270 to 2280 of the second embodiment, a repetitive description thereof will not be given.

Effects of Third Embodiment

The third embodiment can obtain better effects than the aforementioned second embodiment. That is, since the edge enhancing process by means of filtering is executed in addition to the replacement process described in the second embodiment, the luminance values of a text edge part which cannot be sufficiently replaced by white or black pixels by the replacement process alone can be enhanced by the effect of the edge enhancing process by means of filtering, and can be more closer to those of white or black pixels.

For example, upon scanning a black character of a document, a character edge is weak, and includes many intermediate colors depending on the character quality of the document itself and scanner performance. FIG. 27 shows an example of the brightness distribution around a black character upon applying contrast correction to such document.

In FIG. 27, since a maximum brightness=244 and a minimum brightness=6, if only the replacement process is used, the interest pixel (brightness=70) is not replaced by a black pixel but by a pixel value of a pixel with the brightness=6. In such case, upon executing the edge enhancing process by means of filtering together, the edge enhancing amount ΔFe is added. As a result, since the enhancing effect increases, the interest pixel is more likely to be a black pixel.

More specifically, a black character edge part can be easily configured by white and black pixels, and a sharp black character image can be consequently obtained. Even for a color character other than a black character or a character with a background other than white, the luminance difference around the character edge is enhanced by the edge enhancing process by means of filtering, and a sharper character image can be obtained.

Fourth Embodiment

As has been described in the first, second, and third embodiments, a document image undergoes the text modification process to remove intermediate color from a text part, thus modifying it to a sharper image. At this time, since a black character area in the document image also undergoes the under-color removal and black paint processes, it is replaced by black or white pixels as a result of the intermediate color removal process, and is modified to an image with sharp black characters.

The fourth embodiment will explain a printing apparatus which comprises the text modification process described in the first, second, and third embodiments. The fourth embodiment uses the aforementioned MFP as an embodiment of this printing apparatus. However, this embodiment can be similarly applied to any other apparatuses as long as they have means for inputting document image data via a wired or wireless communication and a recording processor which has the same features as the aforementioned ink-jet device. That is, when the apparatus comprises the recording process unit which has a mechanism that outputs an image for respective lines by adopting a system for sequentially outputting a document image for respective lines as an output system, and can output, upon using only a monochrome material, a larger number of lines simultaneously than a case including color materials, a satisfactory result can be obtained by applying the fourth embodiment to that apparatus.

Note that the fourth embodiment uses the text modification process used in the second embodiment but may use those used in the first or third embodiment. Also, the effects of the fourth embodiment can be suitably obtained irrespective of the embodiments of the text modification process as long as the text modification process can replace a black character part by black or white pixels.

FIGS. 13A, 13B, 13C, and 13D are flowcharts for explaining the operations of the fourth embodiment. The following explanation will be given along respective steps described in the flowcharts.

Figure 13A:
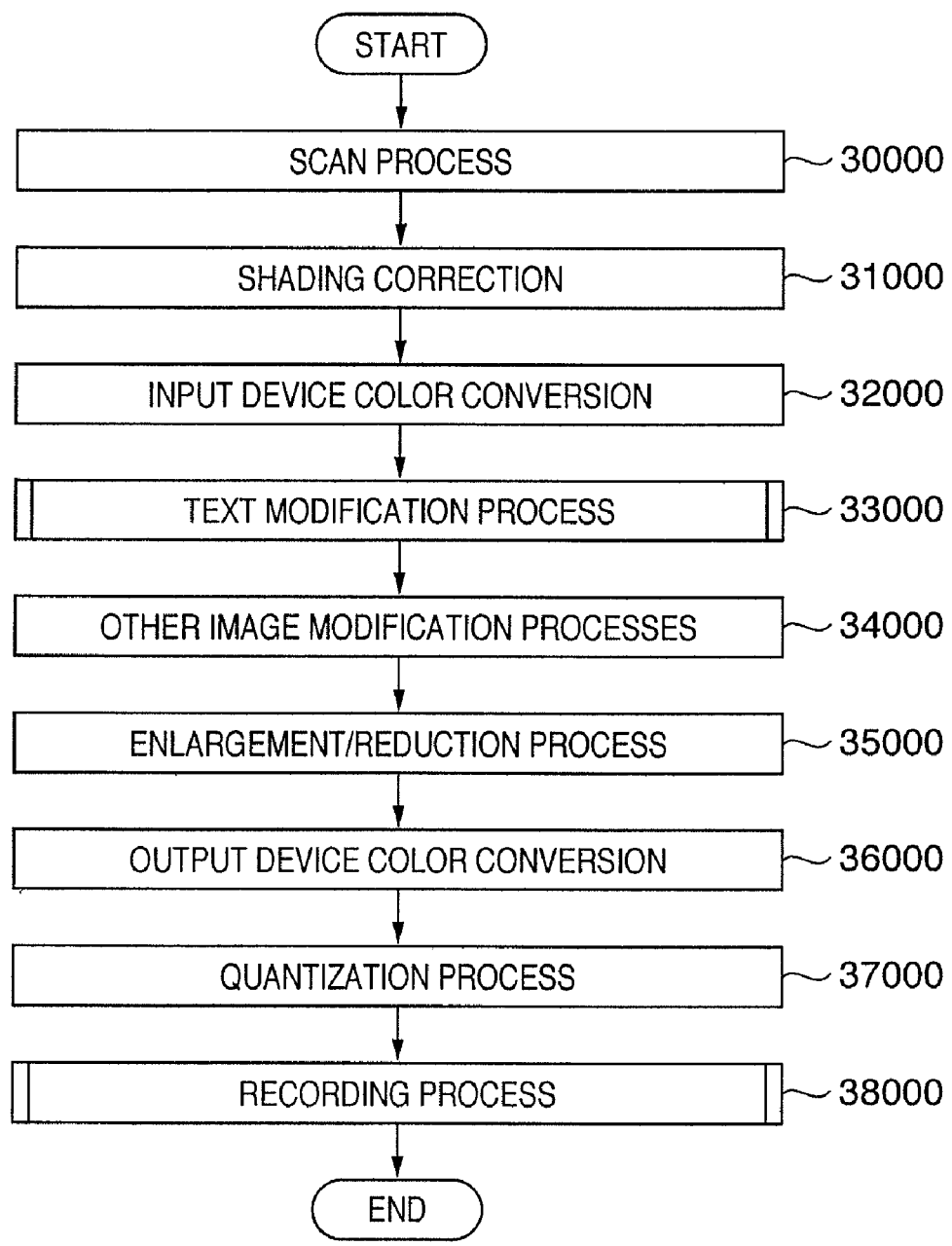
Figure 13B:
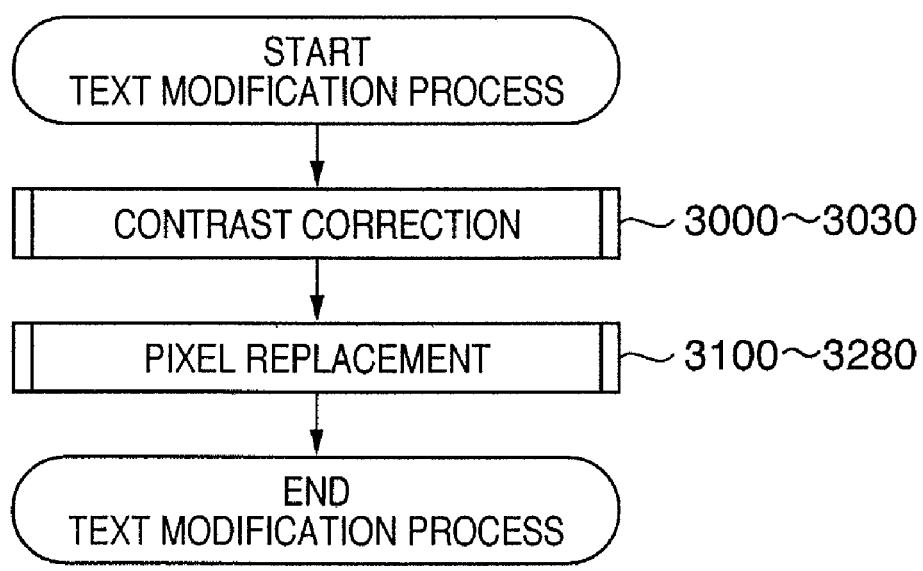
Figure 13C:
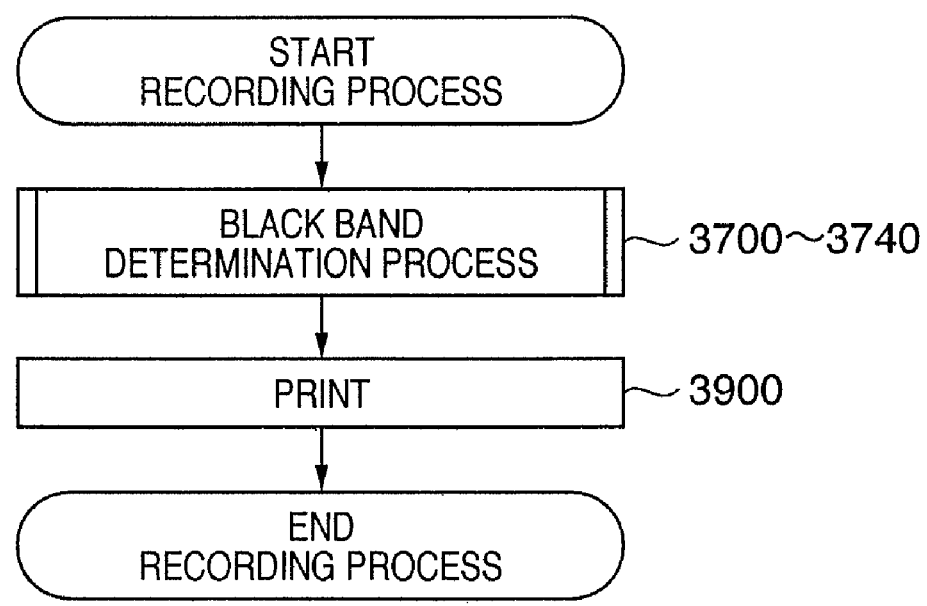

FIG. 13A is a flowchart of the overall copy operation of the MFP 1 according to the fourth embodiment. The MFP at this time comprises the aforementioned arrangement shown in FIG. 2, and the process of the image processor 12 is shown in FIG. 3 above.

Respective steps of the copy operation will be described below.

After the start of the process in FIG. 13A, the MFP 1 scans a document image using the scanning unit 14 in step 30000. The scanning unit 14 has been explained using FIG. 2. The process advances to step 31000, and the image processor 12 executes shading correction. This corresponds to the operation in step 301 in FIG. 3. Furthermore, in step 32000, the image processor 12 executes input device color conversion. This corresponds to the operation in step 302 in FIG. 3. Moreover, in step 33000 the image processor 12 executes the text modification process. This process is expressed by the flowchart of FIG. 13B. In this flowchart, the processes in step 3000 to 3280 are the same as those in steps 2000 to 2280 of the second embodiment, and a repetitive description thereof will be avoided.

After that, in step 34000 the image processor 12 executes image processes other than the text modification process. This corresponds to step 303 in FIG. 3. In this case, since the image processes are executed after the text modification process, some image processes which are preferable to be executed before the text modification process may be executed before step 33000.

In step 35000, the image processor 12 executes an enlargement/reduction process. This corresponds to the operation in step 304 of FIG. 3. The process then advances to step 36000 to execute an output device color conversion process. This corresponds to the operation in step 305 of FIG. 3.

In step 37000, the image processor 12 executes a quantization process. This corresponds to the operation in step 306 of FIG. 3. With this quantization process, information as to whether or not to print dots of respective colors inks for each pixel of a print image can be obtained. This information is used as print image information. FIG. 20A shows an example of the print image information. Note that the print image information is expressed as an actual image for the sake of simplicity, but includes information as to whether or not to print dots of respective color inks for each pixel of the image drawn in FIG. 20A in practice. That is, areas "colored characters and colored graph" includes information that instructs to print dots of C, M, Y, K, PC, and PM color inks in correspondence with colors.

Since the remaining areas have already been replaced by black or white pixels as a result of the aforementioned text modification process, these areas include information that does not print any C, M, Y, PC, and PM ink dots, and prints K ink dots. In step 38000, a recording process is executed using the recording unit 13. The process in this step is expressed by the flowcharts in FIGS. 13C and 13D. Respective steps will be described below. Steps 3700 to 3740 are those of a black band determination process. After the start of the process in FIG. 13D, in step 3700 a first line of the print image information is set as an interest line (see FIG. 20B). The process advances to step 3710, and if dots other than black ink dots are not printed on every pixel on the interest line based on the print image information of the interest line, the interest line is determined to be a black line; if dots other than black ink dots are printed, the interest line is determined to be a color line. The determination result is stored in the RAM 17 as black or color line information.

If it is determined in step 3720 that the interest line is not the last line of print data, the process advances to step 3730. In step 3730, the next line of the current interest line is selected as a new interest line. The process then returns to step 3710 to repeat the aforementioned processes until the interest line reaches the last line of the print data. If the interest line reaches the last line of the print data, the process advances to step 3740 to complete determination as to whether each line of the print image information is a black or color line.

That is, the RAM 17 stores black line information and color line information for one page of the print image information. For example, FIG. 20C shows the black line and color line determination results for the print image information shown in FIG. 20A. Lines which are determined to be black lines are expressed by gray (shaded) rectangles, and those which are determined to be color lines are expressed by white rectangles.

Note that the black line information and color line information are expressed by rectangles for the sake of simplicity. However, in practice, these pieces of information are held in the RAM 17 in the form of a bit sequence of, for example, digital data "0" (black line) and "1" (color line).

A part where the black lines continue over a length equal to or larger than the length corresponding to the black ink head length in the print data is determined to be a black band, and the remaining part is determined to be a color band. For example, FIG. 20D shows the black and color band determination results for the print image information shown in FIG. 20C. Parts which are determined to be black bands are expressed by gray (shaded) rectangles, and those which are determined to be color bands are expressed by white rectangles.

Note that the black band information and color band information are expressed by rectangles for the sake of simplicity. However, in practice, these pieces of information are held in the RAM 17 as digital data. The form of holding such information need only allow recognizing to which of the black band and color band each line in the print data belongs. For example, the form of a bit sequence of "0" (belongs to a black band) and "1" (belongs to a color band), or the form of a combination of information indicating to which of the black band and color band the first line belongs and information which lists the switching positions of lines of the black and color bands may be used. After that, a print process is executed in step 3900.

An image described in the print image information is printed using the black band information and color band information obtained in this way. In this case, each black band part is printed using only the black ink head, and each color band part is printed using the color ink heads and black ink head.

Upon printing an image using only the black ink head, the print process is executed using the full length of that ink head. Upon printing an image using both the color ink heads and black ink head, the print process is executed using a combination of part "a" of the black ink head and parts "b" of the color ink heads in FIG. 8.

In the description of the fourth embodiment, the text modification process, black band determination process, and print process are sequentially executed for each image. Alternatively, the respective processes may be sequentially executed for a plurality of lines of an image. In this case, upon printing an image for one page, while executing the print process of lines that have undergone the black band determination process, the text modification process and black band determination process for lines after the lines whose print process is in progress can be executed. For this reason, the process time required from the start to the end of the copy operation can be shortened.

In the description of the fourth embodiment, the print process operations are switched depending on the results of the black band determination process. Also, at the time of completion of the text modification process, black and color pixels can be determined. The determination process of black and color pixels is executed at this timing, and the operations of other correction/modification processes and color conversion process that follow the text modification process may be switched by reflecting the results of the determination process. In this case, the processes for black pixels can be simplified compared to those for color pixels, thus speeding up the copy operation.

Note that a part where black lines continue over a length equal to or larger than the length corresponding to the ink head length is used as a criterion for a black band. Alternatively, black and color bands may be divided based on other criteria. In this case, as long as the constrained condition for the criterion indicating that all pixels which belong to a black band part as the determination result are those which do not use C, M, Y, PC, and PM inks is satisfied, the way the inks are used upon printing is not influenced by the way black and color bands are divided (as an extreme example, even if all lines are determined to belong to a color band). The occupation ratios and switching intervals of black and color bands change when the way the black and color bands are divided is changed, thus changing the time required for printing.

In the description of the fourth embodiment, the black band determination process is executed after the quantization process. However, the black band determination process may be executed after the output device color conversion process. In this case, the interest line can be determined as a black line when it is determined that all signal values of inks other than the K ink for all pixels in the interest line are zero. Likewise, the black band determination process may be executed after the enlargement/reduction process. In this case, the interest line can be determined to be a black line when it is determined that all pixels of the interest line are "R=G=B=0" or "R=G=B=255".

Effects of Fourth Embodiment

By the fourth embodiment, the following effects can be further obtained in addition to those by the second embodiment.

Upon copying and printing a document image including both text and a photograph, since a black character part can be printed using only the black ink alone without using any color inks, the print result of sharp characters which suffer less ink bleed can be obtained, thus improving black character quality and legibility.

Furthermore, since a black band part configured by black characters can undergo printing of a larger area by a single print operation, the print process can be speeded up compared to printing using mixed color inks.

According to the fourth embodiment, since a text part other than black characters can be printed to be free from any intermediate colors in an edge part as a result of the replacement process, the print result with sharp character edges can be obtained.

The effects of the embodiments of the present invention will be further explained below. For example, the effects obtained when the image processing apparatus of the present invention is used for an input image shown in FIG. 25A will be described.

Figure 26A:
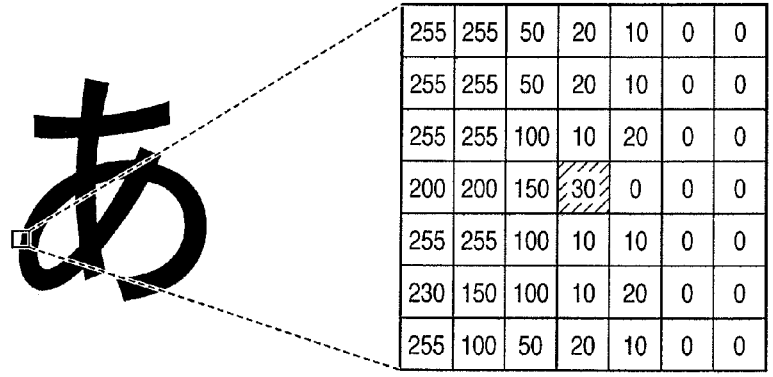
FIGS. 26A and 26B are explanatory views of brightness distributions upon applying the contrast correction according to the embodiment of the present invention to a document image.

A contrast correcting means corrects the image shown in FIG. 25A to that shown in FIG. 25B. That is, since most of a background becomes white, and most of a character becomes black, white and black pixels exist around the black character at a high probability. FIG. 26A shows an example of the brightness distribution around the black character after the contrast correction.

Next, an intermediate color removing unit corrects the image in FIG. 25B to that shown in FIG. 25C. Upon execution of the replacement process, pixels around the black character are replaced by black or white pixels to remove intermediate colors.

Figure 26B:
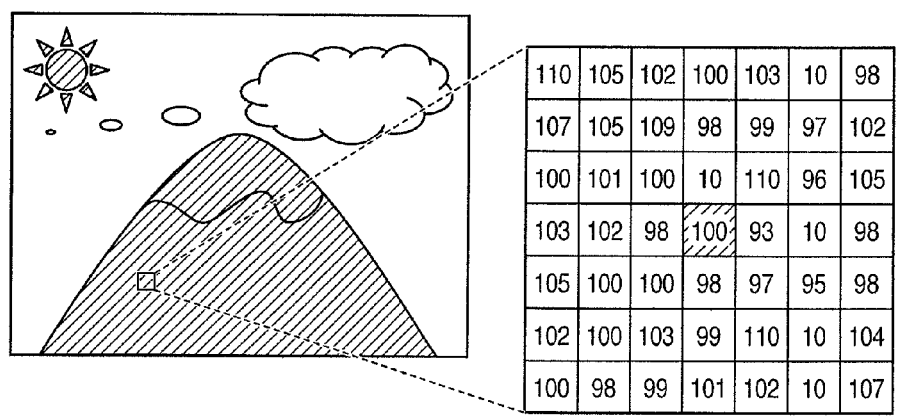

The intermediate color removing unit attains not the binarization process of black and white but the process for replacing pixel values of the interest pixel from surrounding pixels. For this reason, in a smooth tone area such as a photograph area or the like in a document, since pixel values of surrounding pixels are similar to each other, and a replacement candidate is selected from these pixels, the difference between the pixel values before and after replacement becomes small. FIG. 26B shows an example of the brightness distribution of the photograph area after the contrast correction.

Since the magnitude of a change in pixel value before and after replacement changes continuously based on the distribution of pixel values of pixels around the interest pixel, switching of the modification processes between a black character area and the remaining area, which occurs in the prior art, does not occur.

According to the image processing apparatus of the present invention, a character part of both characters other than the black character and on a color background can be sharply modified by the effect of the replacement process. For example, even for a document area with a yellow background on which red characters are written, since the document area is reconfigured by yellow and red, intermediate colors at the boundaries between the characters and background can be removed, and a character part can be modified to a sharp image.

According to the image processing apparatus of the present invention, upon printing an image that has undergone the image processes, when an apparatus such as an ink-jet printing device (to be described later) has a mechanism that outputs an image for respective lines by adopting a system for sequentially outputting a document image for respective lines as an output system, and simultaneously outputs a larger number of lines than a case including color materials upon using only a monochrome material, the printing speed of an image including black characters together can be increased while maintaining higher image quality than the prior art.

The objects of the present invention are also achieved by supplying a storage medium, which records a program code of a software program that can implement the functions of the aforementioned embodiments to a system or apparatus. That is, the present invention is also implemented when a computer (or a CPU or MPU) of the system or apparatus reads out and executes the program code stored in the storage medium. In this case, the program code read out from the storage medium implements the functions of the aforementioned embodiments, and the storage medium which stores the program code constitutes the present invention.

As the storage medium for supplying the program code, for example, a flexible disk, hard disk, optical disk, magneto-optical disk, CD-ROM, CD-R, magnetic tape, nonvolatile semiconductor memory card, ROM, and the like may be used. When the computer executes the readout program code, the functions of the aforementioned embodiments can be implemented in some cases.

However, the present invention also includes a case wherein the functions of the aforementioned embodiments are implemented by some or all of actual processes executed by an OS (operating system) running on the computer based on an instruction of the program code.

Furthermore, the present invention also includes a case wherein the program code read out from the storage medium is written in a memory of a function expansion board or a function expansion unit, which is inserted into or connected to the computer. After that, the functions of the aforementioned embodiments are implemented by some or all of actual processes executed by a CPU or the like of the function expansion board or function expansion unit based on an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188692, filed Jul. 7, 2006, which is hereby incorporated by reference herein in its entirety.

What is claimed is:

1. An image processing apparatus for executing a correction process on an image including a plurality of pixels each of which includes signal values corresponding to a plurality of colors, comprising at least a processor and memory, said processor and memory functioning as:
    a setting unit constructed to set an image area in the image including a process-target pixel;
    a first generating unit constructed to generate, for each pixel included in the image area, a brightness value from the signal values;
    a deciding unit constructed to decide a replacing pixel out of the pixels included in the image area based on the brightness value of each pixel included in the image area;
    a second generating unit constructed to generate replacing signal values based on the signal values only of the process-target pixel and of the replacing pixel;
    a replacing unit constructed to replace the signal values of the process-target pixel with the replacing signal values; and
    a correcting unit constructed to determine whether or not the brightness value of the process-target pixel is larger than a first threshold or smaller than a second threshold which is smaller than the first threshold, and correct the signal values of the process-target pixel based on the determination, such that
        the signal values of the process-target pixel are corrected to values indicating "white" when it is determined that the brightness value of the process-target pixel is larger than the first threshold, and
        the signal values of the process-target pixel are corrected to values indicating "black" when it is determined that the brightness value of the process-target pixel is smaller than the second threshold.

2. The image processing apparatus according to claim 1, wherein the signal values corresponding to the plurality of colors include signal values corresponding to red, green, and blue.

3. The image processing apparatus according to claim 2, wherein said first generating unit generates the brightness value Y by $$Y = 0.29891 \times R + 0.58661 \times G + 0.11448 \times B,$$

wherein R, G, and B represent the signal values corresponding to red, green, and blue, respectively.

4. The image processing apparatus according to claim 1, wherein the signal values corresponding to the plurality of colors contain luminance and color difference components.

5. The image processing apparatus according to claim 4, wherein the brightness value corresponds to the luminance component.

6. The image processing apparatus according to claim 1, wherein said deciding unit selects, out of the pixels included in the image area, one of a pixel whose brightness value is highest and a pixel whose brightness value is lowest as the replacing pixel.

7. The image processing apparatus according to claim 1, wherein said deciding unit decides the replacing pixel based on primary derivatives and secondary derivatives of the brightness values.

8. The image processing apparatus according to claim 1, wherein said second generating unit generates the replacing signal values by interpolation between the signal values of the process-target pixel and the signal values of the replacing pixel.

9. The image processing apparatus according to claim 1, wherein said second generating unit generates the replacing signal values by using either the signal values of the process-target pixel or the signal values of the replacing pixel as the replacing signal values.

10. The image processing apparatus according to claim 1, wherein said correcting unit corrects the signal values of the process-target pixel which has undergone the replacement by said replacing unit.

11. An image processing method for executing a correction process on an image including a plurality of pixels each of which includes signal values corresponding to a plurality of colors, comprising:
- a setting step of setting an image area in the image including a process-target pixel;
- a first generating step of generating, for each pixel included in the image area, a brightness value from the signal values;
- a deciding step of deciding a replacing pixel out of the pixels included in the image area based on the brightness value of each pixel included in the image area;
- a second generating step of generating replacing signal values based on the signal values only of the process-target pixel and of the replacing pixel;
- a replacing step of replacing the signal values of the process-target pixel with the replacing signal values; and
- a correcting step of determining whether or not the brightness value of the process-target pixel is larger than a first threshold and or smaller than a second threshold which is smaller than the first threshold, and correcting the signal values of the process-target pixel based on the determination, such that
  - the signal values of the process-target pixel are corrected to values indicating "white" when it is determined that the brightness value of the process-target pixel is larger than the first threshold, and
  - the signal values of the process-target pixel are corrected to values indicating "black" when it is determined that the brightness value of the process-target pixel is smaller than the second threshold.

* * * * *